United States Patent [19]
Cowan

[11] Patent Number: 5,383,554
[45] Date of Patent: Jan. 24, 1995

[54] CONTAINER FOR STORING AND DISPLAYING AN ARTICLE

[76] Inventor: David M. Cowan, 167 N. 9 St., Brooklyn, N.Y. 11211

[21] Appl. No.: 155,473

[22] Filed: Nov. 19, 1993

Related U.S. Application Data

[63] Continuation-in-part of Ser. No. 931,666, Aug. 19, 1992, which is a continuation of Ser. No. 713,731, Jun. 11, 1991, abandoned.

[51] Int. Cl.⁶ ............................................. B65B 85/57
[52] U.S. Cl. .................................... 206/310; 206/313; 206/804
[58] Field of Search ............... 206/307, 309, 310, 311, 206/312, 313, 44 R, 817, 804, 44.12

[56] References Cited

U.S. PATENT DOCUMENTS

| | | |
|---|---|---|
| 4,216,857 | 8/1980 | Huang . |
| 4,379,507 | 4/1983 | Llabres . |
| 4,465,453 | 8/1984 | Turner et al. . |
| 4,488,645 | 12/1984 | Yamaguchi . |
| 4,499,995 | 2/1985 | Turner ............................. 206/313 X |
| 4,535,888 | 8/1985 | Nusselder . |
| 4,630,732 | 12/1986 | Sayman . |
| 4,641,747 | 2/1987 | Mestdagh et al. . |
| 4,694,954 | 9/1987 | Moss . |
| 4,702,369 | 10/1987 | Philosophe . |
| 4,702,533 | 10/1987 | Seifert . |
| 4,718,547 | 1/1988 | MacTavish . |
| 4,749,081 | 6/1988 | Carlson et al. . |
| 4,759,442 | 7/1988 | Gregerson et al. . |
| 4,760,914 | 8/1988 | Gelardi et al. . |
| 4,771,883 | 9/1988 | Herr et al. . |
| 4,771,890 | 9/1988 | Holfand et al. . |
| 4,773,061 | 9/1988 | Stark et al. . |
| 4,781,292 | 11/1988 | Sacherman et al. . |
| 4,793,480 | 12/1988 | Gelardi et al. . |
| 4,805,769 | 2/1989 | Soltis et al. . |
| 4,805,770 | 2/1989 | Grobecker et al. . |
| 4,807,749 | 2/1989 | Ackeret . |
| 4,817,792 | 4/1989 | Seifert . |
| 4,819,799 | 4/1989 | Nomula et al. . |
| 4,871,065 | 10/1989 | Hehn et al. . |
| 4,875,578 | 10/1989 | Nehl . |
| 4,881,640 | 11/1989 | Herr et al. . |
| 4,899,875 | 2/1990 | Herr et al. . |
| 4,903,829 | 2/1990 | Clemens . |

(List continued on next page.)

FOREIGN PATENT DOCUMENTS

| | | |
|---|---|---|
| 0277076A2 | 8/1988 | European Pat. Off. . |
| 0337181A1 | 10/1989 | European Pat. Off. . |
| 0341178A1 | 11/1989 | European Pat. Off. . |
| 2603028 | 2/1988 | France . |
| 2606755 | 5/1988 | France . |
| 3414903A1 | 10/1985 | Germany . |
| 2064486 | 6/1981 | United Kingdom . |
| 2187441 | 9/1987 | United Kingdom . |
| WO87/05884 | 10/1987 | WIPO . |

OTHER PUBLICATIONS

"The 39th Annual Design Review," *The International Design Magazine* Jul./Aug. 1993, p. 123.
"Music Firms Try Out 'Green' CD Boxes," *The Wall Street Journal,* Thursday, Jul. 25, 1991, p. B1.

*Primary Examiner*—Jacob K. Ackun, Jr.
*Attorney, Agent, or Firm*—Bryan Cave

[57] ABSTRACT

A container that may be used for displaying an article, for example, for sale and thereafter for storage, is disclosed. The container may have a drawer and a tray, both of which can slide in and out of the container housing. As the drawer is pulled out of the housing, the tray is forced to move out of the housing, but only to a limited extent. When the drawer is pushed back into the housing to close it, the drawer pushes the tray back into the housing. The container is particularly useful for displaying and storing articles such as compact discs on the drawer and the booklet that typically accompanies the compact disc on the tray. Because the tray is only partially moved out of the housing even at the tray's maximum outward extent of travel, the booklet can be easily removed without hindering removal of the compact disc. Whether or not the container has a tray, the drawer may be locked in an open position for display and sale.

28 Claims, 13 Drawing Sheets

U.S. PATENT DOCUMENTS

| | | |
|---|---|---|
| 4,905,217 | 2/1990 | King et al. . |
| 4,916,567 | 4/1990 | Grobecker et al. . |
| 4,925,023 | 5/1990 | Goldblatt et al. . |
| 4,928,816 | 5/1990 | Zusy . |
| 4,993,552 | 2/1991 | Bugbey . |
| 5,000,316 | 3/1991 | Lerner .................. 206/804 X |
| 5,011,010 | 4/1991 | Francis et al. . |
| 5,097,946 | 3/1992 | Emrich .................. 206/309 X |
| 5,190,150 | 3/1993 | Schultz et al. .............. 206/309 |
| 5,265,721 | 11/1993 | Castritis .................. 206/313 X |
| 5,269,409 | 12/1993 | Brandt et al. ............ 206/310 X |
| 5,285,893 | 2/1994 | Misteska et al. ............ 206/310 |

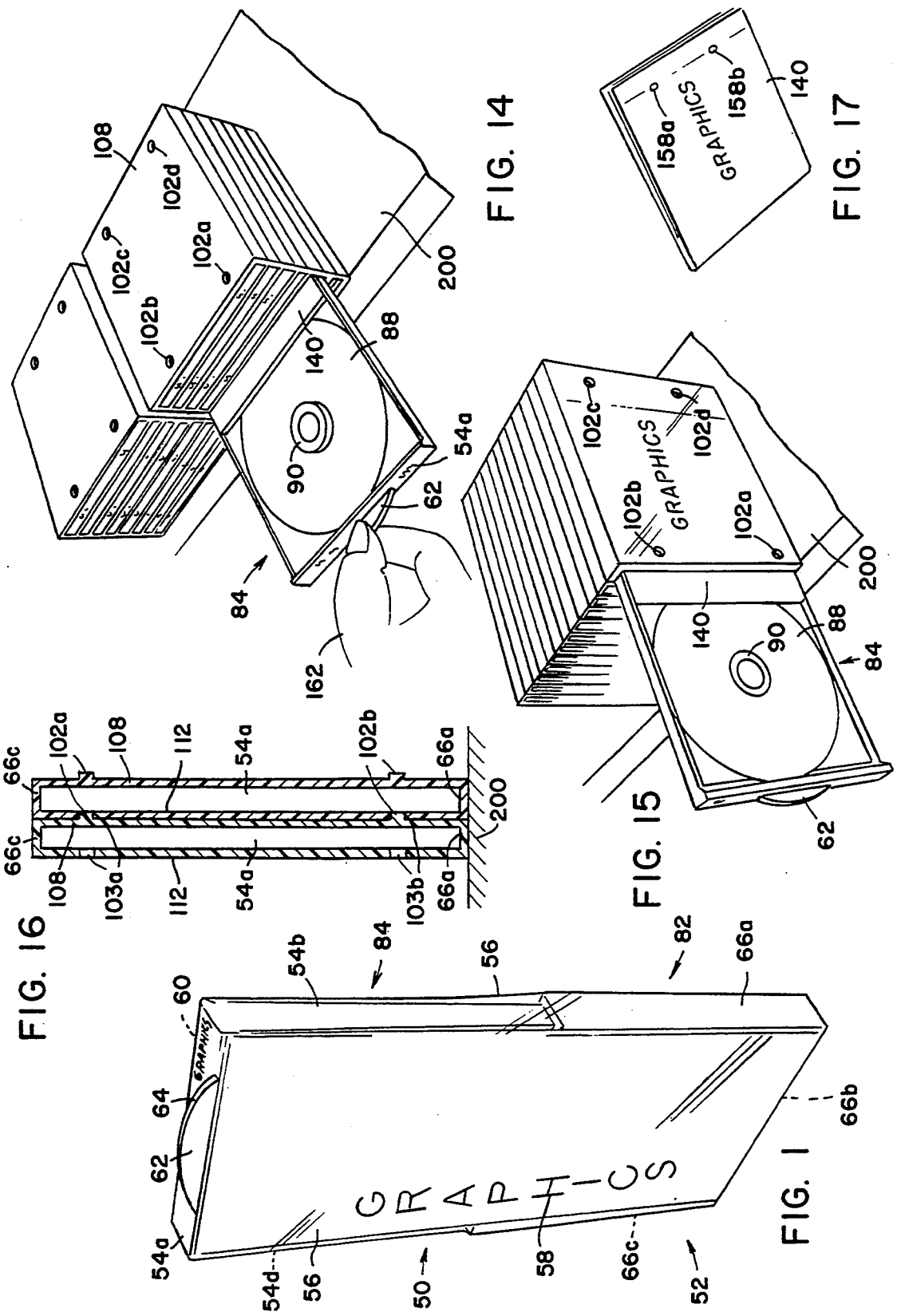

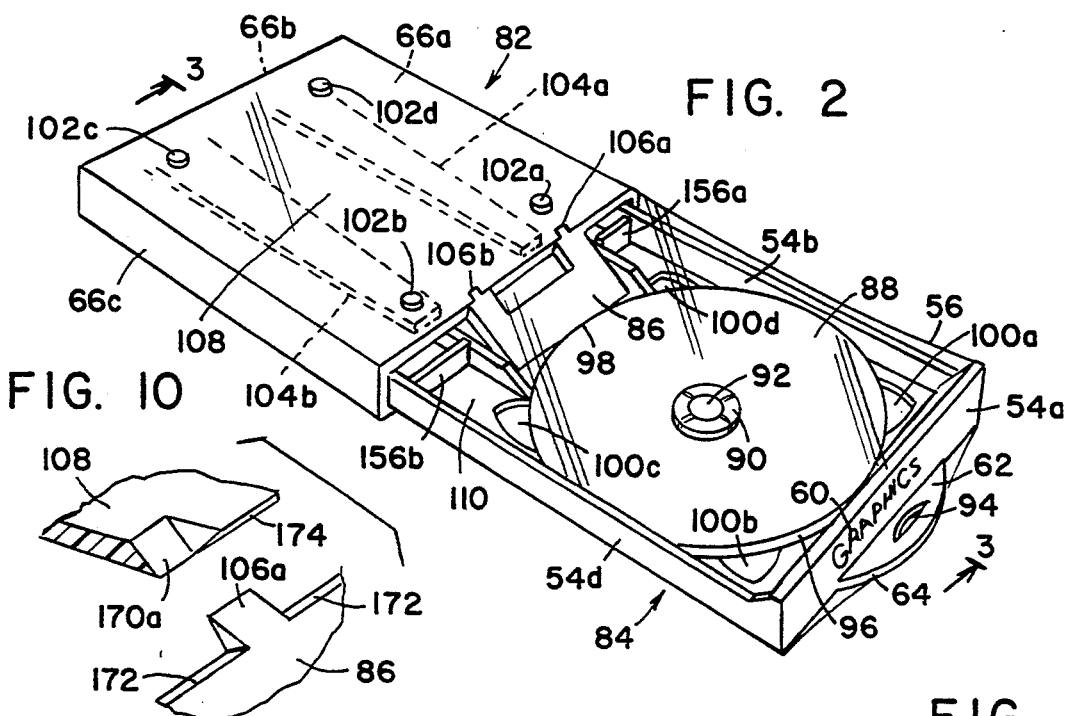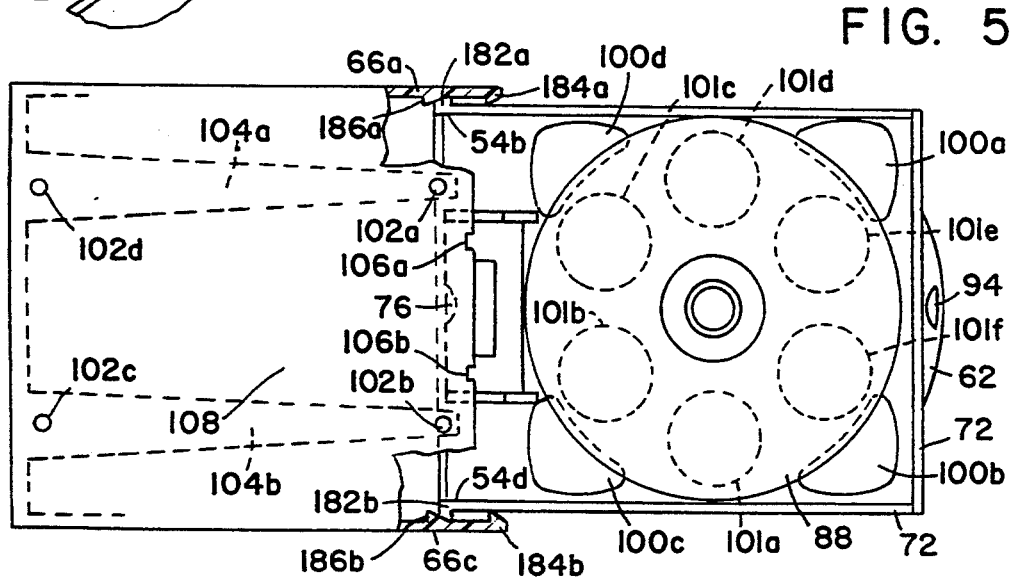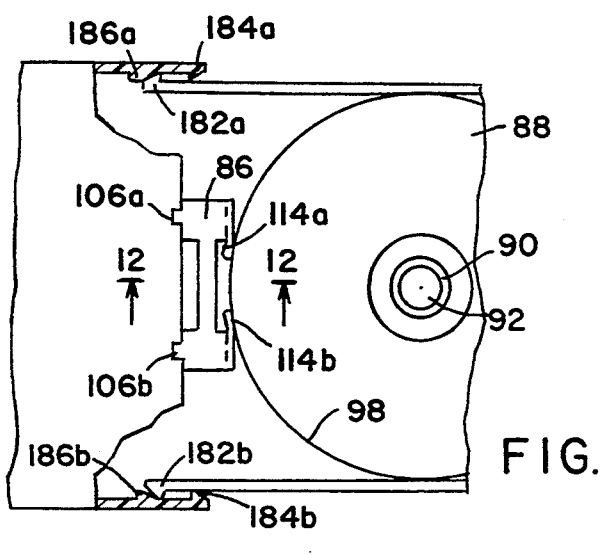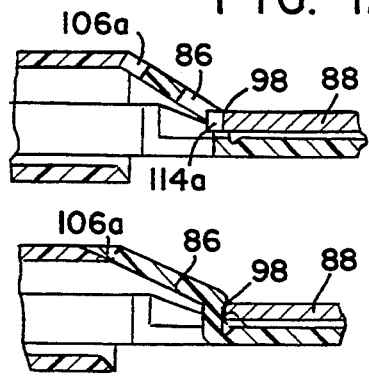

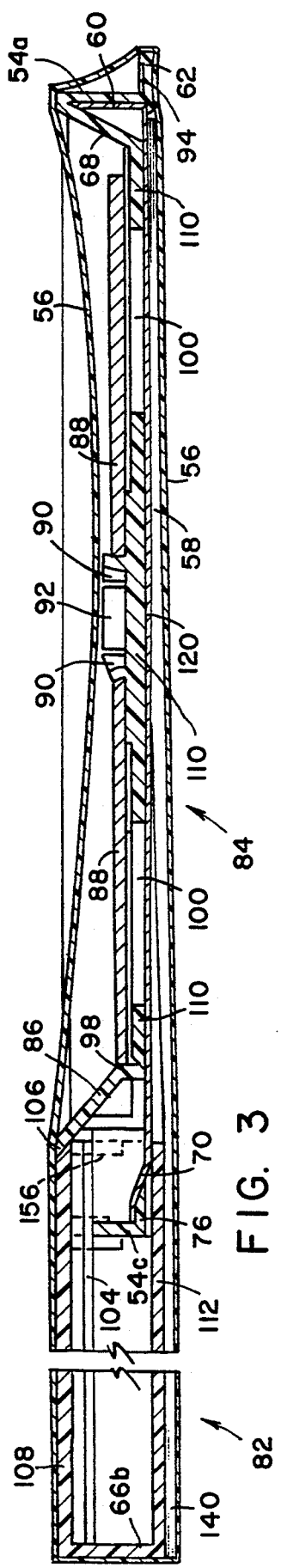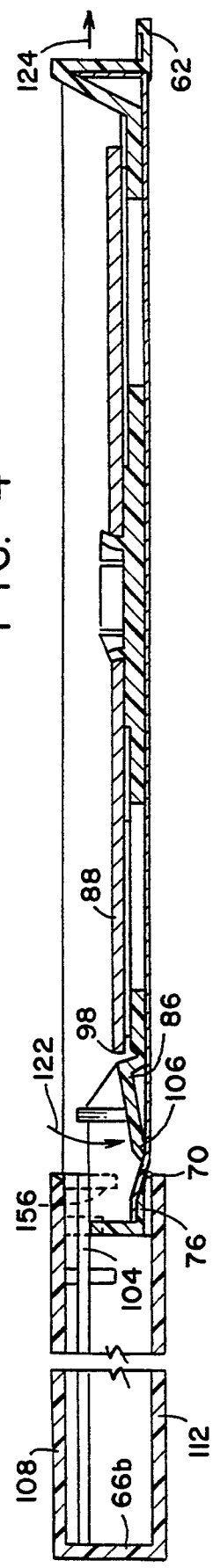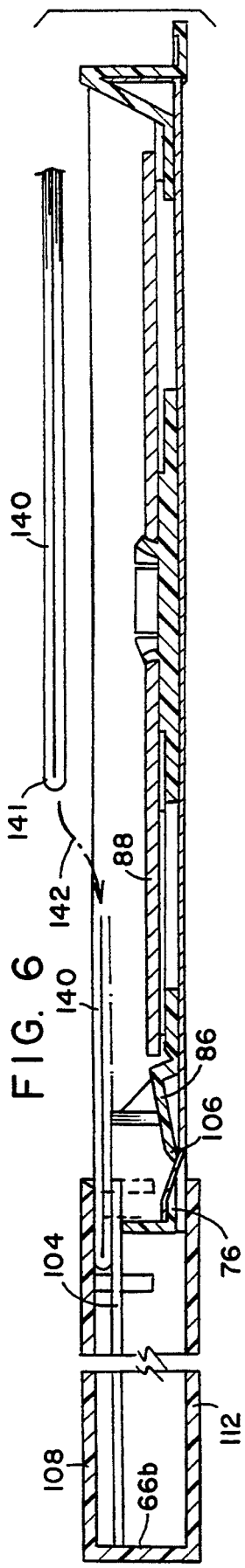

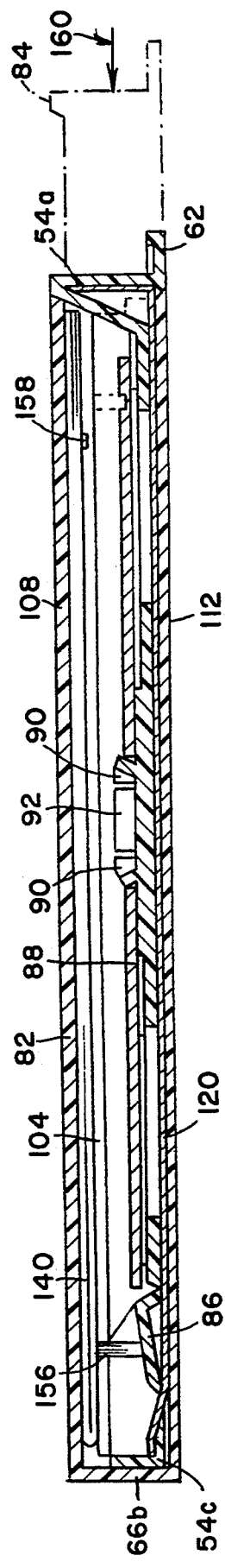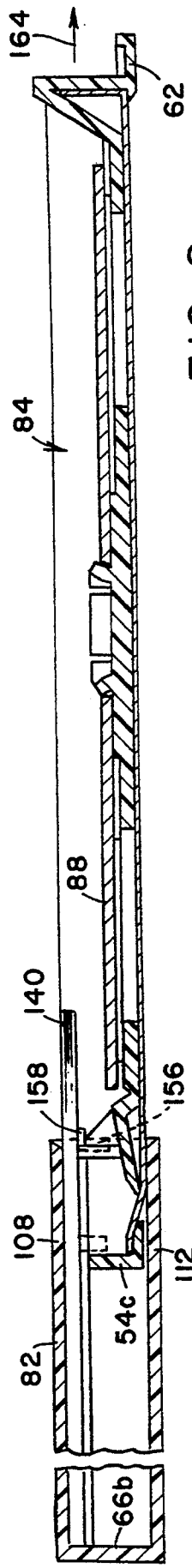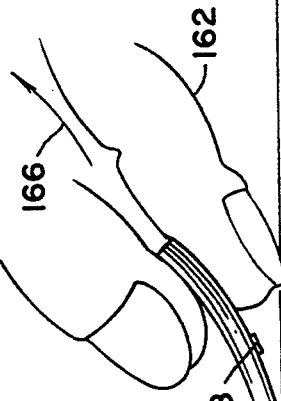

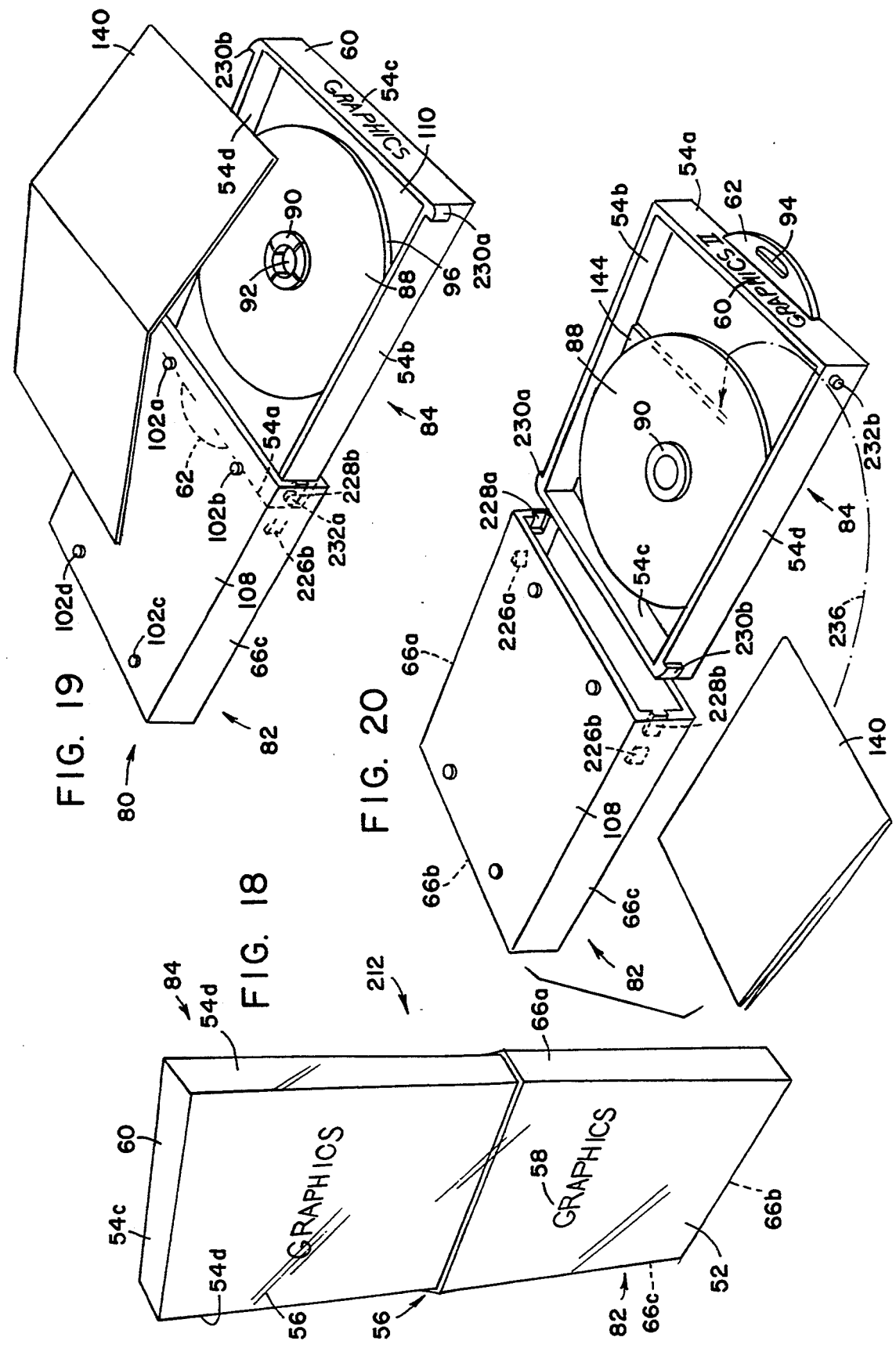

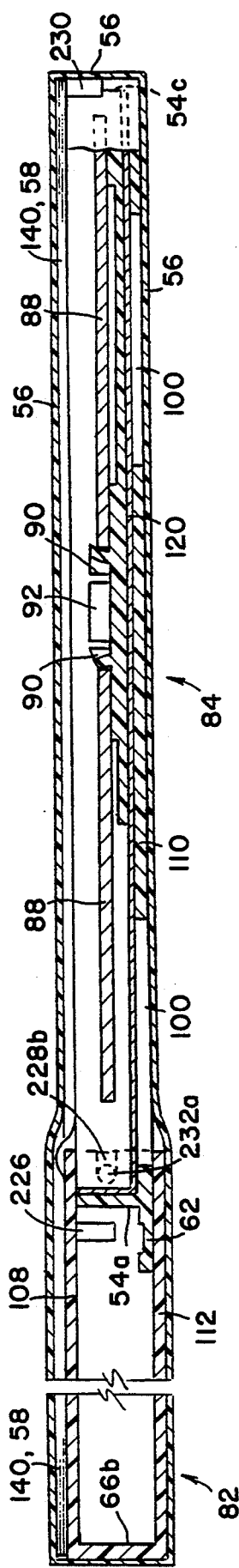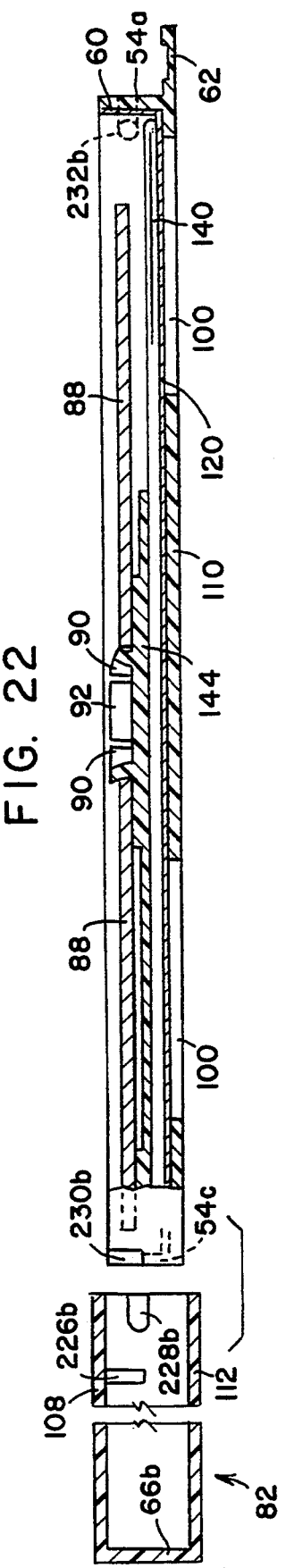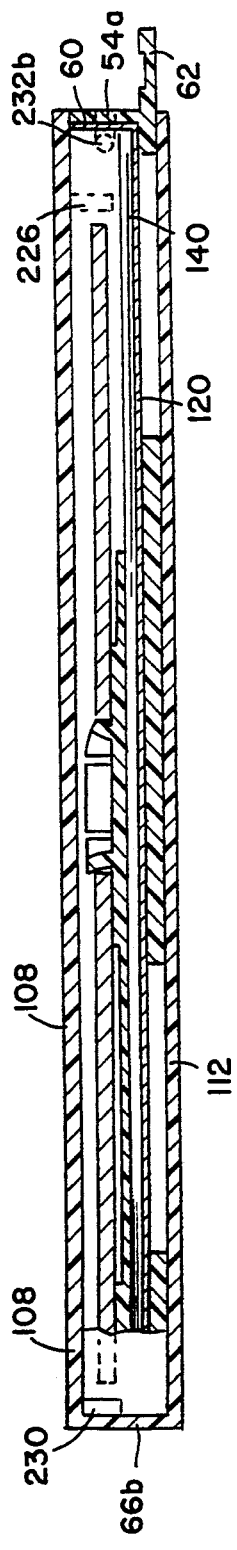

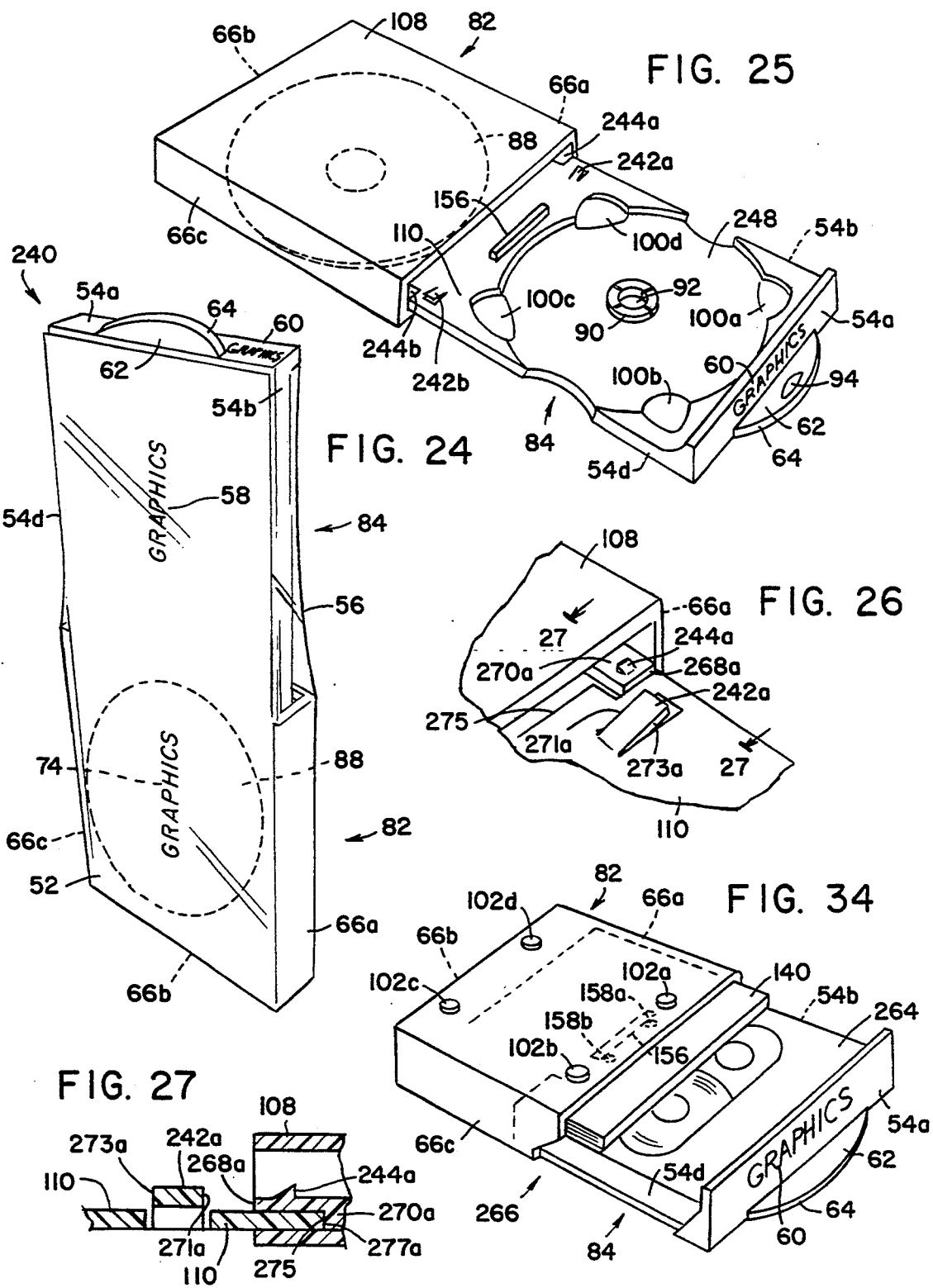

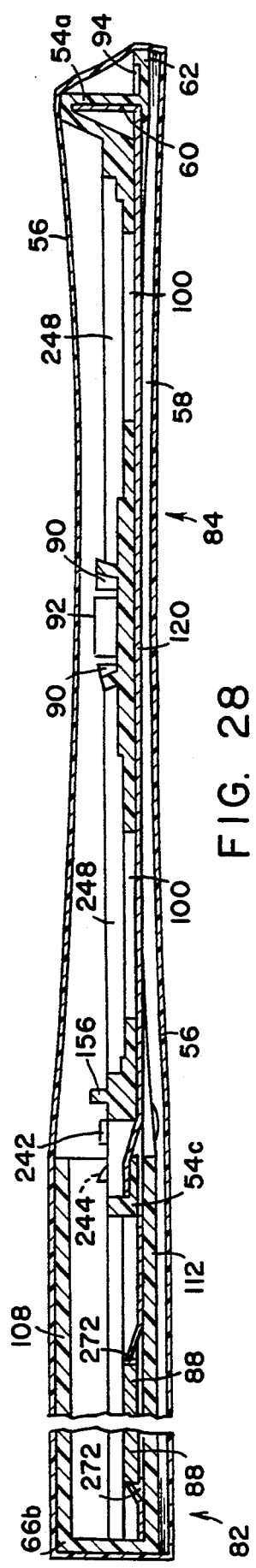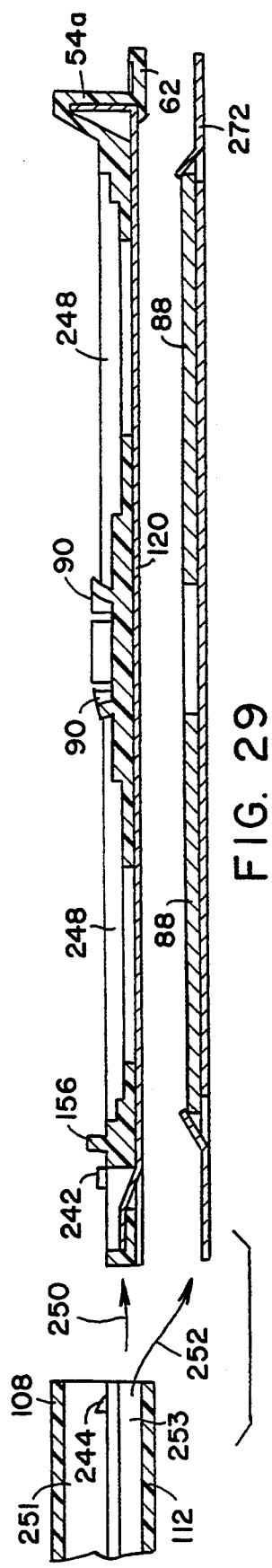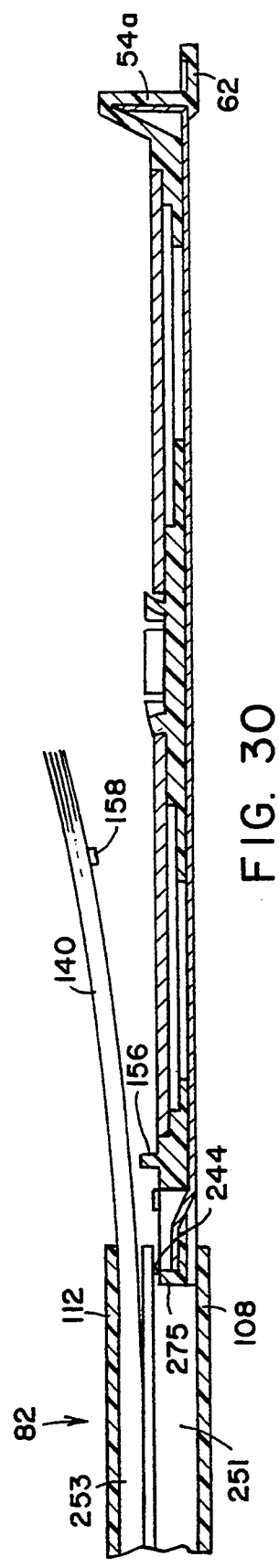

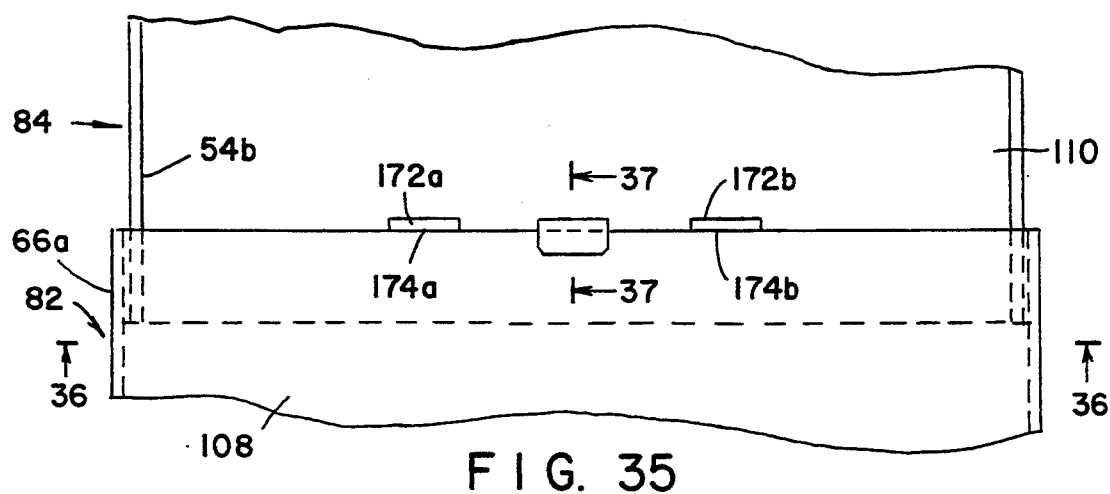
FIG. 35
FIG. 36
FIG. 38
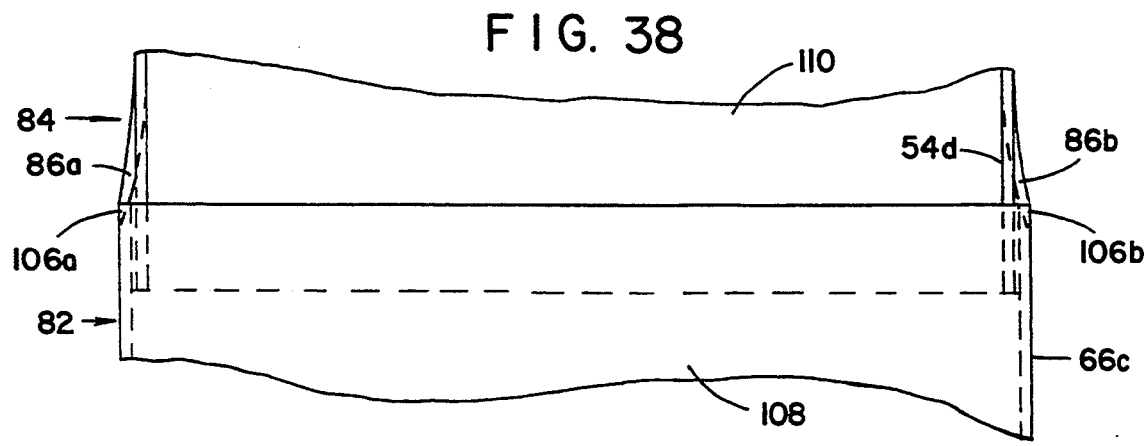
FIG. 39
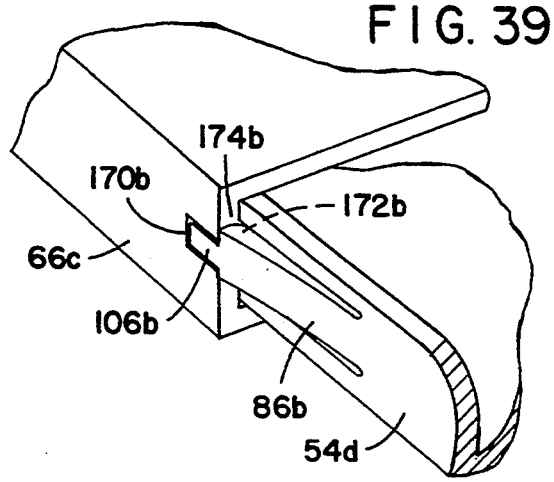
FIG. 37
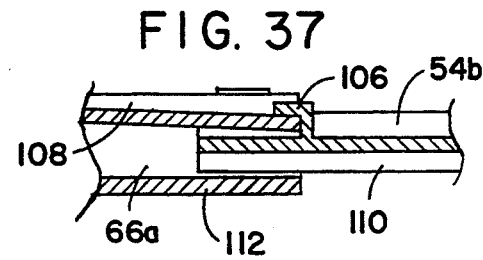

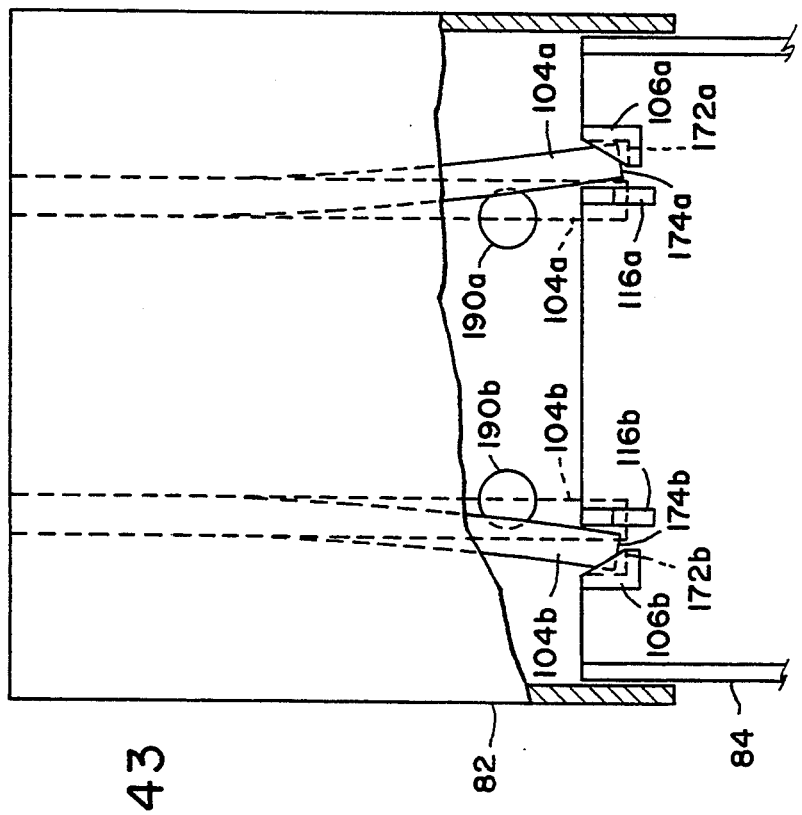
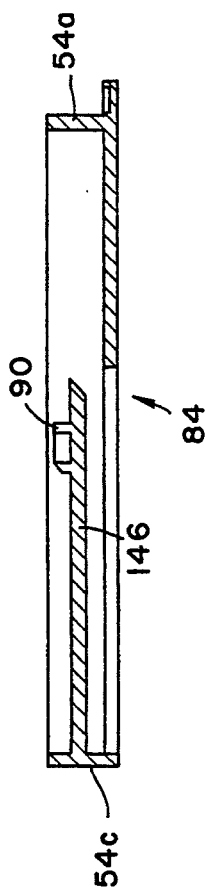
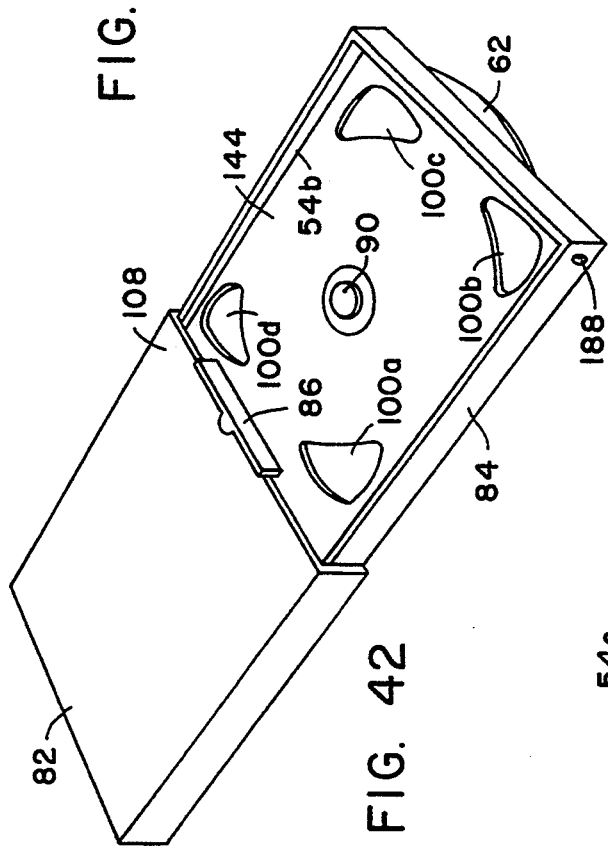
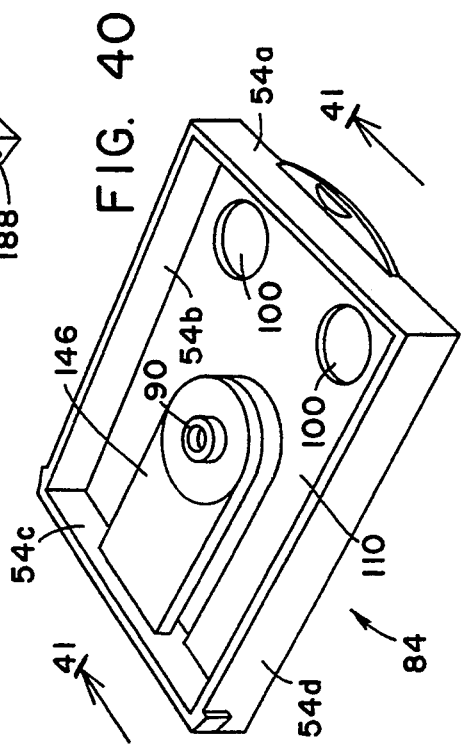

CONTAINER FOR STORING AND DISPLAYING AN ARTICLE

RELATED APPLICATIONS

This application is a continuation-in-part of U.S. patent application Ser. No. 07/931,666, filed Aug. 19, 1992, which is a continuation of U.S. patent application Ser. No. 07/713,731, filed Jun. 11, 1991, now abandoned.

BACKGROUND OF THE INVENTION

This invention relates to the field of containers for storing and displaying articles and also particularly to the field of containers for storing and displaying compact discs.

As advances in technology allow many familiar products to be reduced in size, retailers struggle to keep up. There are many advantages to miniaturization, but the new small products also have become more susceptible to theft and more difficult to display, and their diminished visual presence may reduce sales.

Pilferage is often a significant problem for retailers and as products become smaller, the problem becomes more serious. Smaller products are obviously easier to conceal, but smaller products also make it more difficult to implement theft deterring measures, including use of electronic security devices.

The shelves or fixtures used by the retailers are sometimes designed to present specific products in a flattering way and often incorporate anti-theft features. When a product's size is changed, the current fixtures may not be able to adapt to and efficiently display the new product. The retailer can be faced with the cost of modifying or replacing the fixturing.

Packaging and visual appeal are always key elements in the successful marketing of a product. Miniaturized products often lack the visual presence of their larger predecessors and may sell poorly for this reason alone.

The practice of selling compact discs (also referred to herein as "CDs") in large outer packages is a good example of retailers responding to product miniaturization. The now widespread acceptance of the 5-inch CD has almost completely eliminated the production of 12-inch record albums. CDs are packaged in "jewel boxes" comprising a shallow box with one or two hinged covers and a separate tray component to hold each CD. The jewel box measures approximately 5×5½ inches, which is considerably smaller than the 12×12-inch record album that it replaces.

When CDs were first introduced, retailers had no place to display the small and relatively expensive product. Subsequently, retailers requested that CDs be packaged to fit existing record album store fixtures. Record distributors responded by supplying each CD and its jewel box in a 6×12-inch outer package ("long box") with full color graphics. The 6× 12-inch format could form two columns of CDs in a bin designed to hold one column of record albums. The 12-inch height and large graphics allowed record buyers to feel comfortable flipping through a rack of the new CDs. The added size also acted to deter theft.

Now that hundreds of millions of CDs are being sold in the United Sates each year, the practice of packaging CDs in large outer packages has created considerable waste disposal and environmental problems.

Accordingly, there is a significant need for packaging that minimizes waste but still meets the retailers' requirements for security, fixturing, and visual appeal. Solutions to this problem should preferably also try to solve other drawbacks of the known designs. Jewel boxes are difficult to open and close, especially for people with small hands or people with limited manual dexterity. Elaborate devices are sometimes needed to help people open jewel boxes. (See, e.g., Zusy, U.S. Pat. No. 4,928,816.) The known jewel boxes are easily broken, especially where the thin legs that form the hinges meet the cover. Jewel boxes are also difficult to store and usually require special racks or shelves. Booklets containing lyrics and the like often accompany compact discs, but such booklets are not easily removed from, or returned to, their jewel boxes.

Several retailing procedures have been developed to eliminate the 6×12-inch outer package and still control theft, but all of these procedures require extra effort by the retailer. In one version, clear plastic envelopes containing only the lyric booklets are displayed. The consumer receives the compact disc and the jewel box at the check-out counter. In another case, jewel boxes are displayed on circular files, and only a sales clerk can detach the jewel box from the file. Jewel box flip systems are also employed, in which empty jewel boxes are displayed and customers flip through and remove their selections. The compact discs are housed in protective shields at the check-out counter and are reinserted into their jewel boxes upon purchase. Reusable long plastic frames (often called "keepers") are sometimes employed to display the jewel boxes, but usually a store employee must release the jewel box from the frame for purchase.

Still other alternatives require expensive security measures. Jewel boxes alone can be shrink wrapped and displayed for sale, but the palm sized boxes/discs require additional security devices as compared to the long box to prevent shoplifting. Tags have been developed that contain both price and electronic security information, but many retailers, especially smaller retailers, cannot afford the required anti-theft equipment.

Containers for storing or displaying articles are well known. See, e.g., U.S. Pat. Nos. 4,694,954; 4,702,369; 4,718,547; 4,759,442; 4,760,914; 4,771,883; 4,773,061; 4,805,769; 4,871,065; 4,881,640; 4,899,875; and 4,916,567; and PCT Application WO 87/05884. (All of the documents identified herein, including the foregoing, are incorporated herein by reference in their entireties for all purposes.)

Some of the above-referenced documents relate to frames for displaying CDs. Gelardi (U.S. Pat. No. 4,760,914) concerns a one-piece container for removably securing a compact disc or compact cassette. The CD jewel box is inserted into a securing well within a container. Gregerson (U.S. Pat. No. 4,759,442) concerns a structure for holding an article such as a jewel box. Retainer bars hold the article within the structure, and the article is secured by an inserted bar-pin. MacTavish (U.S. Pat. No. 4,718,547) relates to a receptacle having a hinged closure member for receiving a compact disc. Soltis (U.S. Pat. No. 4,805,769) relates to a CD security holder comprising a pivoting lid member. Hehn (U.S. Pat. No. 4,871,065) relates to a one-piece molded plastic package for securely holding and displaying a CD.

Some of the foregoing documents concern containers comprising insertable drawers. Patents of Herr (U.S. Pat. Nos. 4,771,883, 4,881,640, and 4,899,875) relate to a drawer for storing discs within an outer housing. Tab members prevent the drawer from being completely withdrawn from the housing, and there are means for preventing outward movement of the drawer unless sufficient force is used. Stark (U.S. Pat. No. 4,773,061) relates to a carrier for a disc, comprising releasable latching means on the carrier frame for selectively engaging a disc and urging the disc into engagement with disc support means. Grobecker (U.S. Pat. No. 4,916,567) relates to a tray that is inserted into a bottom section and a latching element that latches a retaining element in its closed position. Frost (PCT WO 87/05884) concerns a shell, a drawer that can slide to and fro in the shell, and lock means for retaining the drawer inside the shell in a closed locked position. When pressure is applied to the lock means, the drawer is released from the closed locked position.

Moss (U.S. Pat. No. 4,694,954) relates to a combination of compact disc and enclosure. The convertible enclosure is folded from a merchandising configuration to a compact storage configuration. In the merchandising configuration, the enclosure's leaf-like elements are maintained in assembled condition by a transparent shrink wrap, which holds those elements closed about a stiffener. Philosophe (U.S. Pat. No. 4,702,369) relates to a storage container having a drawer-like receptacle and shell-like cover for releasably supporting the drawer-like receptacle.

Despite all of these, there is a continuing need for a packaging system for displaying CDs and other articles for sale and the like that minimizes the amount of packaging that must be discarded after purchase without significantly increasing complexity or cost and, desirably, that reduces complexity and cost.

SUMMARY OF THE INVENTION

A container has now been developed that overcomes the above-noted problems and also has numerous other advantages that will be apparent to those skilled in the art.

Broadly, in one aspect the invention concerns a container that may be used for displaying an article and is in an open expanded condition during display and may be placed in a collapsed closed condition for storage of the article. The container greatly reduces the amount of packaging material that must be discarded after the container no longer needs to be in its open expanded condition and desirably is to be used for storing the article. This new container comprises: (a) housing means for slidably holding drawer means; (b) drawer means for holding the article, the drawer means being slidably mounted in the housing means and being capable of being placed (i) in a fully closed position in the housing means and (ii) in one or more open positions; and (c) releasable locking means for temporarily locking the drawer means in an open position so that the drawer means can not normally be slid towards the fully closed position but which locking means can be released to thereafter allow the drawer to be slid between open and fully closed positions.

Another aspect of the present invention concerns a container that may be used for displaying an article, which container is in an open expanded condition during display and may be placed in a collapsed closed condition for storage of the article, the container reducing the amount of packaging material that must be discarded after the container no longer needs to be in its open expanded condition and desirably is to be used for storing the article, said container comprising: (a) housing means for slidably holding drawer means; (b) drawer means for holding the article, the drawer means being slidably mounted in the housing means and being capable of being placed (i) in a fully closed position in the housing means and (ii) in one or more open positions, the drawer means desirably but not necessarily being in substantially the same first plane when it is in one or more of its open positions as when it is in the fully closed position; and (c) releasable locking means for temporarily locking the drawer means in an open position so that the drawer means can not normally be slid towards the fully closed position but which locking means can be released to thereafter allow the drawer to be slid to the fully closed position, the releasable locking means being designed so that once it has been released it no longer normally functions to lock the drawer means in an open position.

Yet another aspect of the present invention concerns a container that may be used for displaying an article, which container is in an open expanded condition during display and may be placed in a collapsed closed condition for storage of the article, the container reducing the amount of packaging material that must be discarded after the container no longer needs to be in its open expanded condition and desirably is to be used for storing the article, said container comprising: (a) housing means for slidably holding drawer means; (b) drawer means for holding the article, the drawer means being slidably mounted in the housing means and being capable of being placed (i) in a fully closed position in the housing means and (ii) in one or more open positions, the drawer means desirably but not necessarily being in substantially the same first plane when it is in one or more of its open positions as when it is in the fully closed position; and (c) releasable locking means for temporarily locking the drawer means in an open position so that the drawer means can not normally be slid towards the fully closed position but which locking means can be released by moving the drawer means towards a more open position so that the drawer means can thereafter be slid between an open position and the fully closed position, the releasable locking means being designed so that once it has been released it no longer normally functions to lock the drawer means in an open position.

The drawer means may be temporarily locked by the releasable locking means in an open position and the releasable locking means may be released by moving the drawer means towards a more open position (i.e., farther away from the fully closed position and whether or not the locked position, fully closed position, and more open position are in the same or different planes) so that the drawer means can thereafter be moved between an open position and the fully closed position. The releasable locking means may be designed so that once it has been released it no longer normally will function to lock the drawer means in an open position.

In some cases the releasable locking means may be released by moving the drawer from its locked position toward the fully closed position. In that case, the drawer may be releasably locked in its fully open position because it does not have to be moved outward any farther to release it.

Less preferably, the releasable locking means may be released in any other way, whether mechanically, electrically, magnetically, and/or by hand, and whether by twisting, bending, cutting, breaking, tearing, deforming, compressing, squeezing, pulling, shearing, or using any other manipulation, method, or means. Thus, for example, the drawer may be locked open for display by one or more members (e.g., pegs) that are slidably mounted in corresponding through-holes in the sides of the drawer and housing. To release the drawer from this locked position, the peg(s) would be removed and discarded. Means such as an overwrap on the outside of the container would prevent the peg(s) from being prematurely removed. In another possible design, one or more members could be mounted in the housing to prevent inward movement of the drawer from its releasably locked position. To release the drawer, those members could be bent out of the way (i.e., out of the path of the drawer in its storage configuration) or those members could be broken off and discarded. Because reducing waste disposal problems is so important, container designs in which the releasable locking means is removed from the container (e.g., the peg(s)) and must be discarded are less preferred.

The releasable locking means may be of any suitable design and may have any size, shape, and configuration and be of any material so long as it can perform its functions. For example, the releasable locking means may comprise a latch having a first stop surface carried by the housing means or by the drawer means, wherein the one of those two means not carrying the releasable locking means has a second stop surface. Locking occurs when the first stop surface hits the second stop surface, thereby preventing the drawer means from normally moving toward its fully closed position. The latch may comprise means to help secure the article in the drawer means, e.g., to prevent rotation or removal of the CD being carried in the drawer means. The drawer means may be releasably locked in a second plane roughly parallel to a first plane in which the drawer means can be moved back and forth between open and fully closed positions. In some embodiments the drawer means must be completely removed from the housing means to release the releasable locking means. The housing and/or drawer would then be rotated (desirably 180 degrees) and the drawer reinserted into a plane (or pathway) in the housing different from the one in which it was temporarily locked. Desirably those planes are roughly parallel, i.e., at an angle to each other not exceeding about 30°, more desirably 20°, preferably 15°, more preferably 10°, and most preferably not more than 5°.

The housing means and drawer means may comprise the same polymeric material, preferably substantially transparent, and most preferably polystyrene.

In other embodiments, the housing means has two oppositely disposed major outer faces with means to attach adjacent containers to form a stack of containers. The attachment means may comprise one or more members on one major outer face of the housing means, preferably protruding members, and one or more complementary mating members on the other major outer face of the housing means, preferably recesses. Preferably, the attachment means are releasable attachment means.

In other preferred embodiments the housing means and drawer means each carry one or more stop surfaces that, when abutting (contacting or touching) releasably lock the drawer means in an open condition for display.

The drawer means may have releasable locking means for releasably holding the article to the drawer means. The housing means usually has two oppositely disposed major faces, desirably at least one of which is transparent to allow the article or something else inside the housing means (e.g., a booklet describing the article, a booklet containing music lyrics, or a cosmetics applicator) to be viewed through the housing means without opening the drawer means.

The first article may be selected from the group consisting of audio tape cassettes, videotape cassettes, compact discs, compact disc-ROMs (also called CD-ROMs, "ROM" indicating "read-only memory"), video laser discs, floppy discs, jewelry, and cosmetics, and most preferably compact discs. Yet other articles may be displayed and stored in the container of this invention.

The container may have means to hold a second article (e.g., material such as a booklet describing the first article) and means to at least partially eject the second article from the housing means as the drawer means is being moved towards the more open position.

Another aspect of the invention concerns a container comprising (a) a housing; (b) a drawer for carrying a first article, the drawer being slidably mounted in the housing so that it can be moved between a fully closed position in the housing and a fully open position in the housing; and (c) a tray for carrying a second article, the tray being slidably mounted in the housing so it can be moved between a fully closed position in the housing and a partially extended position in the housing, the drawer in its fully open position extending from the housing beyond the tray when the tray is in its partially extended position; the container having urging means for urging the tray towards its partially extended position as the drawer is moved towards its fully open position.

Another aspect of the invention concerns a container comprising (a) a housing; (b) a drawer for releasably carrying a first article, the drawer being slidably mounted in the housing so that it can be moved between a fully closed position in the housing and a fully open position in the housing; and (c) a tray for releasably carrying a second article, the tray being slidably mounted in the housing so it can be moved between a fully closed position in the housing and a partially extended position in the housing, the drawer in its fully open position extending from the housing beyond the tray when the tray is in its partially extended position; the container having (i) urging means comprising a surface on the drawer and a surface on the tray for urging the tray towards its partially extended position as the drawer is moved towards its fully open position, (ii) drawer-travel-limiting means for limiting the movement of the drawer so that it cannot normally be moved out of the housing beyond its fully open position, and (iii) tray-travel-limiting means for limiting the movement of the tray so that it cannot normally be moved out of the housing beyond its partially extended position; wherein the tray-travel-limiting means comprises a stop surface carried by the tray and a stop surface carried by the housing that abut when the tray is in its partially extended position to prevent movement of the tray beyond its partially extended position.

Yet another aspect of the invention concerns a container for articles comprising (a) a housing; (b) first means for moving a first article into the housing to protect it and substantially out of the housing to allow it to be removed; (c) second means for receiving a second article in the housing to protect it; and (d) third means for moving the second article no more than partially out of housing to allow it to be removed; the first means cooperating with the third means so that the first means moving the first article out of the housing causes the third means to move the second article out of the housing.

The present invention has many advantages over the prior art. If the releasable locking means are used, the container can be locked in an intermediate open or fully open position to provide the retailer with an appropriately sized product for graphics and/or security means with a minimum of packaging. Existing fixtures can be utilized. The container, in preferred embodiments, can be stacked horizontally or vertically.

The invention as it relates to a container for compact discs offers yet further advantages. The container is easier to open than the known jewel boxes and allows the compact disc to be removed more easily. In preferred embodiments, there are no hinges or thin extensions to break. A second article such as a booklet may be partially ejected from the container when the drawer means is opened, thereby facilitating removal of the booklet and avoiding the problems encountered with known jewel boxes. The single-plastic construction of preferred embodiments facilitates recycling. The booklet and an insert, which are used when the container has been converted into its storage configuration, e.g., for use at home, also carry store display graphics, thereby eliminating the need for disposable package graphics. Other features and advantages of this invention will be apparent to those skilled in the art.

BRIEF DESCRIPTION OF THE DRAWINGS

To facilitate further discussion of the invention, the following drawings are provided in which:

FIG. 1 is a perspective view of a first embodiment (container and package) of the present invention in an open expanded condition;

FIG. 2 is another perspective view of the embodiment of FIG. 1;

FIG. 3 is a longitudinal sectional view taken along line 3—3 of FIG. 2;

FIG. 4 is similar to FIG. 3 but shows the releasable locking means being released by moving the drawer means towards a more open position;

FIG. 5 shows a partial cut-away plan view of the embodiment of FIG. 1;

FIG. 6 is similar to FIG. 4 but shows a second article (a booklet) being placed in the container;

FIG. 7 is similar to FIG. 6 but shows the container in a fully closed position;

FIG. 8 is similar to FIG. 7 but shows the second article (a booklet) being ejected from the housing means as the drawer means is being moved towards the more open position;

FIG. 9 is similar to FIG. 8 but shows a hand pulling the booklet out of the housing means;

FIG. 10 is a partial detail view of the releasable locking means of the container of FIG. 1;

FIG. 11 is a partial plan view of the container of FIG. 1 showing the releasable locking means helping to maintain the disc's orientation for display purposes;

FIG. 12 is a partial sectional view taken along line 12—12 of FIG. 11;

FIG. 13 is a partial sectional view similar to FIG. 12 but shows alternative releasable locking means that temporarily locks the disc to the hub to discourage theft of the disc;

FIG. 14 is a perspective view of vertically stacked containers of the present invention showing a hand opening a drawer to access a CD;

FIG. 15 is a perspective view of horizontally stacked containers of the present invention with a drawer in an open position;

FIG. 16 is a transverse sectional view showing two horizontally stacked containers;

FIG. 17 is a perspective view of a second article (i.e., a booklet) showing its two ejection surfaces;

FIG. 18 is a perspective view of another embodiment (container and package) of the present invention in an open expanded (display) condition in which the drawer handle is inside the housing means (case) and is not visible in this view;

FIG. 19 is a perspective view of the embodiment of FIG. 18 showing a booklet loosely covering the container after the transparent plastic overwrap has been removed and showing (in phantom line) the handle inside the housing means;

FIG. 20 is a perspective view of the embodiment of FIG. 18 showing the booklet and drawer separated from each other and from the housing with the booklet folded closed;

FIG. 21 is a longitudinal sectional view of the embodiment of FIG. 18 with the drawer at least partially within the case and with the handle pointing into the case;

FIG. 22 is similar to FIG. 21 but shows the drawer removed completely from the case and rotated 180 degrees so that the handle is pointing away from the case;

FIG. 23 is similar to FIG. 22 but shows the container in a fully closed storage position;

FIG. 24 is a perspective view of a third embodiment of the present invention in an open expanded (display) condition, with overwrap, in which the CD has not yet been positioned in the drawer and is instead being held in the housing for extra security;

FIG. 25 is a perspective view of the embodiment of FIG. 24 after the plastic overwrap and graphics (lyrics booklet) have been removed and the disc (in phantom line) is still in a secure display position inside the housing means;

FIG. 26 is a detail view of the releasable locking means used in the embodiment of FIG. 24;

FIG. 27 is a longitudinal sectional view taken along line 27—27 of FIG. 26;

FIG. 28 is a longitudinal sectional view of the embodiment of FIG. 24;

FIG. 29 is similar to FIG. 28 but shows the drawer and paper insert completely removed from the housing;

FIG. 30 is similar to FIG. 29 but shows a booklet and the drawer being inserted;

FIG. 34 is a perspective view of another embodiment of the present invention in which the first article being stored is a cassette tape;

FIG. 35 is a partial plan view of alternate releasable locking means;

FIG. 36 is a sectional view taken along line 36—36 of FIG. 35;

FIG. 37 is a sectional view taken along line 37—37 of FIG. 35;

FIG. 38 is a partial plan view of another releasable locking means;

FIG. 39 is a perspective detail view of the releasable locking means of FIG. 38;

FIG. 40 is a perspective view of alternative drawer means;

FIG. 41 is a sectional view taken along line 41—41 of FIG. 40;

FIG. 42 is a perspective view of another possible container according to this invention having alternative releasable locking means;

FIG. 43 is a partial plan view of yet other possible releasable locking means;

Figure 31:
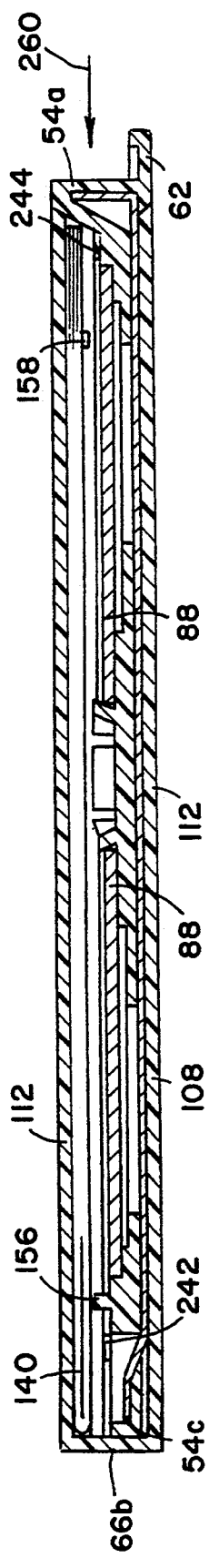
FIG. 31 is similar to FIG. 30 but with the container in a fully closed position.

These drawings are for illustrative purposes only and should not be used to unduly limit the scope of the invention.

DETAILED DESCRIPTION OF THE INVENTION

FIG. 1 is a perspective view of first embodiment (container) 50 in an open expanded condition suitable for display in a retail store. The container may be placed in a collapsed closed condition for storage of article 88 (see FIG. 7), in this case a compact disc. This container reduces the amount of packaging material that must be discarded, as compared to currently used packages for CDs, after the container no longer needs to be in its open expanded condition or configuration.

Referring also to FIGS. 2 and 3, the container comprises housing means 82, having top 108 and bottom 112, slidably holding drawer means 84, having floor 110, for holding article 88. Drawer means 84 comprises drawer means walls 54a,b,c,d (54c is not shown) and drawer means handle 62. Drawer means handle 62, having side 64 and grip 94, may be of any shape and size suitable for pulling, pushing, and/or holding drawer means 84. Grip 94 of handle 62 comprises a depression, cut-out, or the like to facilitate gripping the handle. Housing means 82 has housing means side walls 66a,b,c. The housing means top 108, bottom 112, side walls 66a,b,c, drawer means side walls 54a,b,c,d, and floor 110 need not be straight. Concave, convex, or other shapes may be utilized as long as the shape does not interfere with the workings of the container.

Lying across and visible through full display side 52 of the container is graphical information display 58, and lying across and visible through drawer means front wall 54a is spline graphics display 60. Such graphical displays may be of any suitable type, for example, the outside cover of an open lyric or informational booklet in the case of display 58 and a paper insert in the case of display 60.

The container is wrapped with tight-fitting transparent overwrap 56, which can be removed from the container. Overwrap 56 may be of any suitable material and is preferably transparent so that graphics 58 and 60 and/or article 88 can be seen when the container is being displayed. Materials for overwrap 56 include polyolefins such as polyethylene and polypropylene film. Overwrap 56 is generally tight-fitting to prevent drawer means 84 from being moved out of housing means 82 towards a more open position. Drawer means handle 62 is underneath overwrap 56, although in some cases it may not be necessary to overwrap it.

Drawer means 84 for holding article 88 is slidably mounted in housing means 82 and is capable of being placed (i) in a fully closed position and (ii) in one or more open positions. If the drawer is in an intermediate open position (i.e., not fully open), the drawer can still be moved to a more open position, e.g., the fully open position. Walls 54a,b,c,d of the drawer are at right angles to each other. Drawer means floor 110 may have reliefs 100a,b,c,d (see also FIG. 5). Such reliefs may be holes or indentations incorporated into the drawer floor to minimize the amount of material (e.g., plastic) utilized in the container and/or to facilitate removal of article 88 by allowing fingertips to go below the article (disc) 88 to better grip the article. The holes may be of any suitable number, size, and/or shape, as long as the drawer means maintains a suitable strength and can function properly.

Any suitable article 88 may be carried in or by or on the drawer, such as, for instance an audio tape cassette, a videotape cassette, a compact disc, a compact disc-ROM, a video laser disc, a floppy disc, jewelry, or cosmetics. Here article 88 is a compact disc. The side of compact disc 88 is indicated by reference numeral 96, and the edge of compact disc 88, where the upper major planar face of the disc meets the side of the disc, is indicated by reference numeral 98.

Drawer 84 has hub 90 for positioning the article 88 within the drawer. In this embodiment, hub 90 is funnel shaped and has cylindrical cavity 92. The diameter of the disc's central hole may be greater than the diameter of hub 90 so that disc 88 may be lifted out of the drawer means without encountering any frictional resistance from hub 90. However, a releasable locking means may be positioned in the center of drawer means 84, or elsewhere, to releasably hold the article to the drawer means. For example, in FIG. 3 the sides of hub 90 are angled to help hold the CD in place. Separate and apart from that, and referring to FIG. 7, when container 50 is in a collapsed closed condition (i.e., the drawer means is fully inserted into the housing means), there is not enough clearance for article 88 to move off the hub 90.

Housing means 82 has two oppositely disposed major members: top 108 and bottom 112 (see FIG. 16). These members may be transparent to allow the article or other items located inside the housing means (e.g., a lyrics booklet, a compact disc, or a paper insert) to be viewed through the housing means without opening the drawer means.

The outer faces of members 108 and 112 of the housing may have attachment or stacking means (e.g., protruding members 102a,b,c,d and cavities 103) to attach their respective housing to the housing of one or more other containers of substantially the same type so that a stack of such containers can be formed. Thus, the stacking means may comprise one or more members on one major face of the housing means (e.g., protruding members 102; see also FIG. 16) and one or more mating members on the other major outer face of the housing means (e.g., concavities 103; see FIG. 16).

Releasable locking means 86 temporarily locks the drawer in an open position so that the drawer can not be slid towards the fully closed position. (In some embodiments drawer means 84 is temporarily locked in the fully open position.) The locking means can be released to allow the drawer to be slid to the fully closed position and it may be designed so that once it has been released it no longer normally will function to lock the drawer means in an open position. Some locking means will not be resettable (to perform that temporary locking function) whereas others may be resettable, although after an article has been purchased it would probably be unnecessary to ever reset the locking means.

In this embodiment releasable locking means 86 is normally released by moving drawer means 84 outward, i.e., towards a more open position and away from the fully closed position. Also referring to FIG. 10, releasable locking means 86 comprises a latch having stop surfaces 172 and is carried by drawer means 84, and housing means 82 has stop surfaces 174. Locking occurs when first stop surface 172 hits second stop surface 174, thereby preventing the drawer means from moving towards its fully closed position. Locking means 86, including stop means 172 and 174, may be of any suitable configuration or material. Releasable locking means retainers 106a,b fit into corresponding inclined surfaces or grooves 170a,b in the top of the housing means and keep locking means 86 elevated in the locked position.

As long as stop surfaces 172 and 174 are abutting, the drawer cannot be moved any farther into the housing and the locking means cannot be released (to thereafter allow the drawer to slide inward) until the drawer is first moved outward. However, overwrap 56 temporarily prevents the drawer means from being moved outward. Generally, any suitable means may be used for temporarily preventing the drawer means from being moved towards a more open position, e.g., an outer-package plastic brace and/or adhesive tape and/or a detent system and/or a breakable or tearable member and/or an internal rod. Until the overwrap is removed and the drawer is pulled outward to release the lock, the drawer can not be moved inward to its storage configuration and the container will remain in its display configuration.

Housing means 82 and drawer means 84 may comprise any suitable material, polystyrene, a polyolefin, an acrylic polymer, etc. Housing means 82 and drawer means 84 may comprise the same polymeric material, which may be transparent if desired. Using a single polymeric material facilitates recycling because separation of different polymers prior to recycling is not necessary.

Referring also to FIGS. 4, 5, and 6, drawer means 84 moves in a single plane and in a single pathway between its open positions and its fully closed position. Two-part cantilevered shelf 104 (parts 104a,b) holds second article 140, which here is a flat second article, namely, a lyrics booklet. Any suitable means for holding a second article may be used. The shelf consists of two tongue-like components, 104a and b, which are usually roughly parallel to top 108 of the housing and create an internal space below top 108. Shelf 104 in combination with housing top 108 frictionally grips (exerts drag on) second article 140 so that second article 140 will not follow drawer 84 throughout most of the drawer's movement between the fully closed and maximum open positions. Instead, the booklet remains relatively stationary until drawer 84 is almost fully open. As drawer 84 nears its fully open position, the booklet, which was stored completely inside the housing, is pulled forward so that it is partially out of the housing (see also FIG. 8). Shelf 104 then holds booklet 140 in that position (see, e.g., FIG. 15) so that the booklet may be removed easily.

Hub 90 is funnel-shaped, that is, it progressively increases in diameter as the distance along the hub away from the inside bottom of the drawer increases. This allows the package to be opened while on its side (FIG. 15) without article 88 falling off hub 90. Edge 98 and side 96 of compact disc 88 may frictionally contact releasable locking means 86, which helps secure disc 88 in place and prevents rotation of the disc (see also FIGS. 11, 12, and 13). That may be important if the surface of the disc contains advertising, graphics, or other information for the consumer that desirably should be kept oriented in a particular direction during display.

Diagonal piece 68 (FIG. 3) connects floor 110 to front wall 54a. Most of paper insert 120 is below drawer means floor 110 and contains graphics that will be visible after booklet 140 with spine 141 is removed. The right end of paper insert 120 is folded at a right angle and lies between front wall 54a and diagonal piece 68 and provides spline graphics display 60. The left end of paper insert 120 (sloping piece 70) is folded up slightly and bent around supporting tab 76 to prevent paper insert 120 from moving as the drawer is moved in and out.

FIG. 4 shows releasable locking means 86 after it has been released by moving drawer means 84 towards a more open position as indicated by arrow 124. Before this movement, the drawer means is in an intermediate open position (FIG. 3). Overwrap 56 is removed from the container to permit drawer means 84 to move towards the more open position to allow locking means 86 to release. As the drawer is moved outward, first stop surface 172 (FIG. 10) at some point no longer hits second stop surface 174 of the housing means. Locking means 86 then moves downward as indicated by arrow 122 (FIG. 4) and releases.

The downward movement is caused by the inherent downward bias of the material. The locking means desirably is formed by molding, with the locking means downward (i.e., roughly co-planar with drawer 84). When the locking means is to be set (as when the container is first assembled), the locking means is moved up sufficiently (away from its normal as-molded shape/position) and the drawer is pushed in so that the locking means engages the housing and the locking means is releasably locked in place (retainers 106a,b mate with grooves 170a,b). The subsequently applied overwrap then keeps the drawer from moving outward until after the overwrap is removed.

Instead of using the inherent bias of such molded locking means, a spring or other means may be employed to help release the lock if the locking means is to release automatically when the drawer is moved outward. After the locking means has been released, drawer means 84 is free to slide between the fully open position (or any other open position) and the fully closed position. Generally, the drawer need not be pulled out to its fully open position to access the articles stored therein if they can be removed when the drawer is in an intermediate open position. It may, however, be desirable in some cases to design the container so that the drawer must be fully open before the first and/or second articles can be removed (e.g., to prevent damage to the articles).

In FIG. 5, six round reliefs 101a,b,c,d,e,f in drawer floor 110 are shown in addition to the four reliefs 100a,b,c,d; however, the size and number of all of the reliefs may vary to save material (e.g., plastic) and to facilitate the gripping of smaller articles such as a 3.5-inch disc. Drawer detents 182a,b, housing outer detents 184a,b, and housing inner detents 186a,b interact to prevent drawer 84 from being opened beyond certain points. For instance, when drawer 84 is moved towards a more open position (to the right in FIG. 5), it can be moved until drawer detents 182a,b and housing outer detents 184a,b hit each other. That limits and defines the extended open position that is reached only once to release the locking means (unless the locking means is later reset) and prevents further movement of the drawer away from the housing. When drawer 84 is then moved towards the fully closed position (to the left in FIG. 5), drawer detents 182a,b contact housing inner detents 186a,b and their sloped surfaces push against each other. That causes housing side walls 66a,c to be pushed out slightly and/or drawer means side walls 54b,d to be pushed in slightly and/or for the detents to deform slightly. With further movement towards the closed position, detents 182a,b go past detents 186a,b, that is, the four inclined surfaces of elements 182a,b and 186a,b no longer push against each other. Thereafter, drawer means 84 can move freely from a fully closed position to the normal fully open position where detents 182a,b and 186a,b hit one another, i.e., the four short surfaces of elements 182a,b and 186a,b that are perpendicular to walls 54b,d and 66a,c abut.

FIG. 6 shows how second article 140 can be placed in housing means 82 after the drawer has been pulled out to release locking means 86. Second article 140, in this embodiment a booklet containing lyrics for the music on the CD, which was held to the outside of the container unfolded (open) by the transparent overwrap, is folded and inserted into housing means 82 (as indicated by arrow 142) for storage. (Compare the folded booklet to the booklet in its unfolded (open) form in FIGS. 3 and 19.) Thus, booklet 140 is held on shelf 104, below the inside of top 108 of the housing.

In FIG. 7 the container has been moved to a fully closed position, as indicated by arrow 160. Drawer wall 54c abuts housing wall 66b, although in other embodiments there may be a gap. In this embodiment housing 82 forms a completely closed container with drawer means wall 54a. Such a closed container may not be necessary in every case. Hub 90 has an upper/side bevel, which tends to prevent booklet 140 from being caught on hub 90 as drawer 84 is being moved towards the fully closed position.

In FIGS. 8 and 9, booklet 140 is being ejected from housing 82 as drawer 84 is moved towards a more open position in the direction shown by arrow 164. As drawer 84 is opened, pushing means 156 to eject the second article also moves toward the fully open position. Means 156 eventually engages catching means 158 on the bottom of booklet 140 and moves the leading edge of the booklet beyond the edge of the housing. In this embodiment, pushing means 156 for ejecting the second article is a rib attached to drawer means 84, and catching means 158 are two drops of thermoplastic material on the face of the booklet 140 (see also FIG. 17). Hand 162 can then grab the leading portion of second article 140 and pull it out of the container in the direction shown by arrow 166. Pushing means 156 and catching means 158 can be any suitable means that interact to help at least partially eject the second article. The second article need not be a lyrics booklet and may be almost anything, such as, e.g., an applicator for cosmetics, an informational booklet for electronics equipment.

In FIGS. 11 and 12, tabs 114a,b of an alternate latch design frictionally engage edge 98 and/or side 96 (FIG. 2) of disc 88. This contact prevents the disc from moving. In FIG. 13 a bulbous projection of yet another latch design wraps around side 96 (FIG. 2) and edge 98 of disc 88 to keep the disc from moving. Because latch 86 is immobile until the drawer is pulled out sufficiently to release the latch, this design helps prevent movement of the disc (e.g., rotation, wobbling on the hub, and/or theft of the disc from the package in the display configuration).

In each of FIGS. 14, 15, and 16, a plurality of stacked containers rests on shelf 200. Stacking means 102a,b,c,d on top of each housing and mating stacking means on the bottom of each housing connect adjacent housings to one another. Any means (e.g., VELCRO-type fastening elements, adhesive, buttons and snaps, pop-type connectors) and any number of means may be used. The connections between adjacent housings may be permanent or releasable. In FIG. 14, hand 162 has pulled drawer means 84 open for easy access to disc 88 and booklet 140. In FIG. 15, the disc is held in drawer 84 by engagement with hub 90. In FIG. 16 two housings are joined together. A gap between adjacent stacked housings may be acceptable if it does not adversely affect the stacking capabilities. Projections 102a,b extend from the right-hand surface of each of the two housings and releasably mate with (frictionally fit within) mating cavities 103a,b on the left-hand surface of each housing.

FIGS. 18 and 21 show another embodiment (container) 212 in an open expanded (display) condition. Like the first embodiment, this container has substantial space for graphics 58 and it is covered by overwrap 56, which prevents the drawer from moving out of its locked position in the housing. Unlike the first embodiment, however, in the display (open expanded) condition, drawer means 84 in this embodiment is reversed, i.e., drawer means handle 62 (see FIGS. 19 and 21) is inside the housing.

In FIG. 19 overwrap 56 has been removed. Second article 140, in this case a lyrics booklet, is still in its open position and is loose on the top of the container because overwrap 56 no longer compresses the booklet against the outside of the container. Referring also to FIGS. 20 to 23, drawer means 84 may be slidably mounted in housing means 82 in a first plane for movement between one or more open positions and the fully closed position. Releasable locking means comprises stop surfaces (concavities or pockets) 228a,b of the housing means and stop surfaces 232a,b (pegs) of drawer means. As best seen in FIGS. 19 and 21, drawer 84 is releasably locked by pegs 232a,b hitting or contacting the innermost surfaces of pockets 228a,b of housing 82 so that drawer 84 can not be pushed farther into the housing towards the fully closed position.

FIGS. 20 and 22 show how the releasable locking means of this embodiment is released. After removing the overwrap, the drawer as depicted in FIG. 19 is moved towards a more open position, pulled out of the housing means, rotated 180° on the horizontal plane, and then reinserted into housing 82. Drawer 84 is then pushed into housing means 82, whereupon detents 230a,b come into contact with ramps 226a,b. The sloped surfaces of the two detents and two ramps cause the housing side walls to be pushed out slightly and/or the drawer side walls to be pushed in slightly and/or the detents and/or ramps to deform slightly as the drawer is moved inward into the housing. At some point, detents 230a,b move beyond ramps 226a,b, and the drawer "snaps" into its pathway for normal movement within housing means 82. Thereafter, the drawer can move freely from a fully closed position (FIG. 23) to as far as the open position where the short surfaces of detents 230a,b and ramps 226a,b that are perpendicular to the walls first make contact. Paper insert 120 in this embodiment has two flaps, one lying behind drawer wall 54a to provide Graphics II (FIG. 20) at one end of the drawer and the other flap lying behind drawer wall 54c to provide Graphics (FIG. 19) at the other end of the drawer.

Booklet 140 can be placed in the drawer in two different positions. If it is desired to see the booklet through top 108 of the housing, the booklet can be placed directly on top of disc 88. If it is desired to place the booklet out of the way so as not to interfere with insertion and removal of the disc, the booklet may be placed underneath tray 144 as indicated by arrow 236. Optionally, tongue 146 may be utilized as shown in FIGS. 40 and 41 to support the disc and leave a space for the booklet.

FIG. 24 is a perspective view of another embodiment 240 of the present invention. This embodiment is similar to first embodiment 50, except that walls 54b,d (see also FIG. 25) of the drawer are not as high as in embodiment 50 and disc 88 is held during display in housing means 82 (rather than in the drawer) to provide extra security against pilferage. (Article 88 may also be held for display in the housing in the other embodiments discussed herein.)

In FIG. 25 overwrap 56 and second article 140 have been removed but disc 88 is still inside the housing. Slightly recessed area 248 allows disc 88 to be stored in the drawer without having most of the surface of disc 88 (e.g., areas bearing information) touch the drawer surface.

Referring to FIGS. 25 to 30, drawer 84 is releasably locked in one plane roughly parallel to the plane in which the drawer will be slidably held during storage. Locking occurs when end 275 of drawer floor 110 abuts housing stop surfaces 277a,b of housing means detents 270a,b having ramps 244a,b so that drawer means 84 cannot be slid towards the fully closed position (see FIGS. 26 and 27 for detailed views). (Alternatively and less preferably, locking could be achieved by having rear sides 271a,b of detents 242a,b hit front surfaces 268a,b of detents 270a,b.)

This releasable locking means is released (after overwrap 56 is removed) by moving drawer 84 out of housing 82. Drawer 84 may then be moved to the other plane, turned upside down, and reinserted into the housing so that it can be moved between an open position and the fully closed position. Alternatively, and as shown in FIGS. 29 and 30 for ease of illustration, the drawer may be pulled out of one cavity or pathway of the housing and held stationary and the housing turned upside down or flipped over (rotated 180 degrees about its longitudinal axis) before the drawer is reinserted. Arrow 250 (FIG. 29) indicates movement of drawer means 84 out of housing cavity or pathway 253 of housing means 82. Arrow 252 (FIG. 29) indicates the removal of disc 88 and disc-retaining insert 272 from its secure, display format inside first pathway 253 of the housing. Disc-retaining insert 272 holds the disc in housing means 82 and can also carry information, such as instructions for package use.

In FIG. 30, second article 140 and drawer means 84 are being inserted into the housing means 82, which has been flipped over, i.e., turned upside down. Because the housing has been turned upside down in FIG. 30, ramps 244a,b now point downward. When the drawer is pushed inward far enough, the back wall and edge 275 of the drawer and detents 242a,b will slide under and past ramps 244a,b, thereby defining the fully (maximum) open position of the drawer (in FIG. 30 the back wall of the drawer is sliding under ramp 244 and detent 242 has not yet slid under).

FIG. 31 shows the drawer having been pushed into the fully closed position, as indicated by arrow 260. As the drawer is pulled out, each detent 242a,b moves toward corresponding ramp 244a or b. When surfaces 273a,b of detents 242a,b (see FIG. 26) meet the short rear surfaces of ramps 244 (as in FIGS. 32 and 33), the drawer can not be pulled out any farther, thereby defining the fully open position for normal movement of the drawer in the storage configuration.

Figure 32:
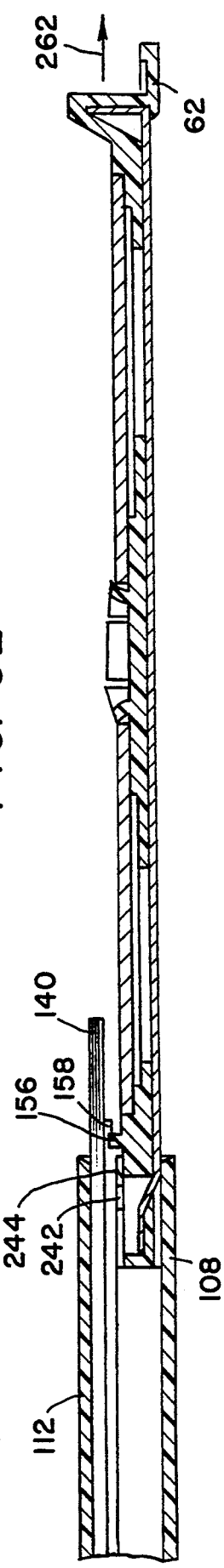
FIG. 32 is similar to FIG. 31 but shows the booklet partially ejected as a result of the drawer having moved towards the more open position.
Figure 33:
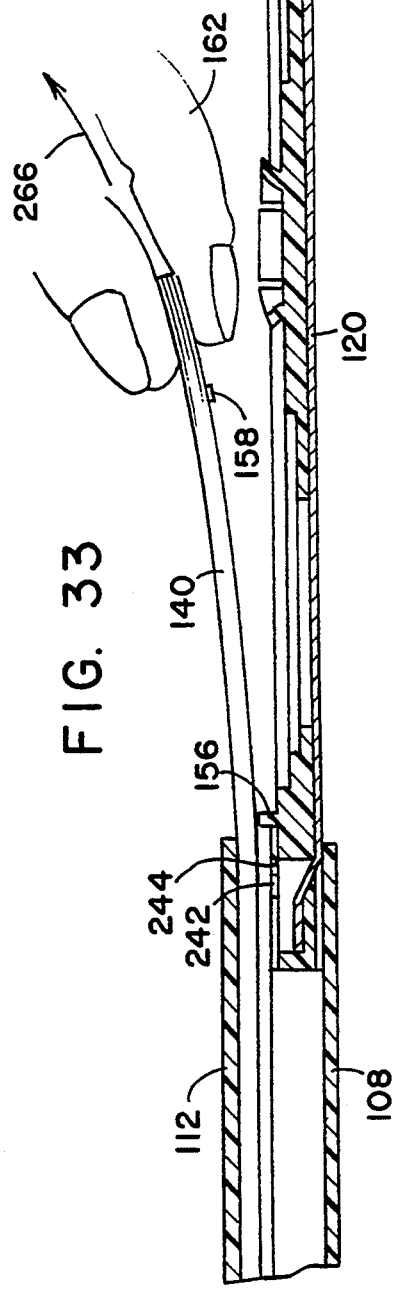
FIG. 33 is similar to FIG. 32 but shows a hand pulling the second article (booklet) out of the housing means.

FIG. 32 also shows second article 140 being partially ejected from the housing as the drawer is being moved towards its fully open position, as indicated by arrow 262. FIG. 33 shows hand 162 removing booklet 140 from the housing means, as indicated by arrow 266.

FIG. 34 shows cassette tape 264 as the article in the container. Other possible articles include: plug-in information modules for computers, printers, and games; cosmetics (e.g., perfume); and jewelry.

FIGS. 35, 36, and 37 show alternative releasable locking means 86. To engage or set this releasable locking means, top 108 of the housing is flexed down while drawer means 84 is being inserted into the housing. A single retainer 106, which is integral with the drawer, is positioned above the top of the housing because of the downward flexing of the housing. Retainer 106 grabs the edge of the housing as the drawer is moved inward, thereby keeping the middle of the housing flexed down and the middle of the drawer bottom flexed up (see particularly FIG. 36). Stop surfaces 172a,b, on the drawer, contact housing stop surfaces 174a,b, thereby preventing further inward movement of the drawer. When the drawer is pulled out, the top of the housing returns upward to its flat (unflexed) shape, the bottom of the drawer returns downward to its flat (unflexed) shape, and the drawer may thereafter be pushed inward to its fully closed position.

FIGS. 38 and 39 illustrate other possible releasable locking means. Drawer 84 is inserted into housing means 82 while releasable locking means 86a,b are flexed outward (i.e., away from the middle of the drawer). Retainers 106a,b hold releasable locking means 86a,b in the locked position with surfaces 172a,b (only one of which is shown) abutting the edge of the housing, which prevents the drawer from moving any farther towards the fully closed position. Overwrap 56 (not shown) keeps the drawer from being pulled out. After the overwrap is removed, the drawer is moved towards an extended open position, means 86a,b spring inward, and the drawer may be pushed inward to close it completely, because surfaces 172a,b and 174a,b will no longer be able to contact each other unless locking means 86a,b are reset.

FIGS. 40 and 41 show an alternative design for drawer 84. This configuration uses tongue 146 having hub 90, which allows drawer 84 to be manufactured in one piece. Lyrics booklet 140 (not shown) may be stored either on top of the disc (not shown) or underneath the tongue itself.

In FIG. 42, releasable locking means 86 engages the leading edge of top 108 of housing 82 to prevent inward (closing) movement of drawer 84. Means 86 is integral with (fixedly attached to) the end of tray 144 closest to the housing. As will be appreciated by considering the inner surface of drawer side wall 54b in this view, the end of the tray nearest the housing has been lifted (rotated up about pin 188) so that means 86 can engage the housing. Because of the pin, the end of tray 144 nearest handle 62 remains near the bottom of drawer 84. When drawer 84 is first pulled out (after the overwrap has been removed) to release locking means 86, the previously elevated end of the tray is free to fall down in the drawer. Means 86 will not thereafter hinder the normal inward and outward movement of the drawer. Disc 88 (not shown) rests on hub 90 and booklet 140 (not shown) may be stored underneath tray 144 in drawer 84 or on top of the disc, or, preferably, on a pair of cantilevered arms that facilitate partial ejection of the booklet. Fingerholes 100a,b,c,d facilitate removal of the disc from tray 144 and, if necessary, removal of tray 144 from drawer 84. Locking means 86 may also be pulled up to help remove the tray.

Alternatively, if the type, area, and strength of joinder of releasable locking means 86 to tray 144 are so engineered, means 86 could be released by forcing drawer 84 inward to break the joinder. Means 86, which would no longer be attached to tray 144, could then be discarded and the drawer would be free to move normally between open and closed positions. Locking means 86 could instead be designed to bend so that the top of means 86 would move downward towards the top surface of tray 144 to release the locking means. In that case, means 86 would still be connected to tray 144 and could be used to lift the tray, e.g., to access the booklet. In either case (breaking or bending), it would not be easy to reset locking means 86.

In FIG. 43 the two cantilevered tongue-like elements comprising shelf 104 (elements 104a,b) are used as part of the releasable locking means. The distal ends of elements 104a,b are attached to the inside of rear wall 66b. The proximal ends of elements 104a,b constitute stop surfaces 174a,b, which abut internal stop surfaces 172a,b of retainers 106a,b attached to drawer 84 to releasably lock drawer 84 in housing 82 and prevent inward movement of the drawer. Elements 116a,b of drawer 84 hold shelf elements 104a,b outward away from the center to maintain contact of surfaces 174a,b with surfaces 172a,b.

Before the releasable locking means is first set, shelf elements 104a,b are straight and are accessible through holes 190a,b. To set the locking means, elements 104a,b are pushed outward by a tool inserted through holes 190a,b and drawer 84 is inserted far enough into the housing so that shelf elements 104a,b abut retainers 106a,b as shown in FIG. 43. The tool is then withdrawn. (Holes 190a,b may be the same as cavities 103a,b that constitute part of the attachment means; see FIG. 16.)

As drawer 84 is moved towards a more open position, at some point elements 116a,b will have moved past the proximal ends of shelf elements 104a,b, thereby allowing shelf elements 104a,b to spring inward so that surfaces 174a,b will no longer hit stop surfaces 172a,b. The drawer will then be free to move in and out because shelf elements 104a,b will ride up on top of the ramp-shaped elements 116a,b (i.e., the proximal ends of shelf elements 104a,b will be on top of the elements 116a,b and above the bottom of drawer 84). These releasable locking means may also be used in embodiments where the drawer is withdrawn completely from the housing, the drawer and/or housing is rotated 180 degrees, and the drawer is reinserted into the housing.

Figure 44:
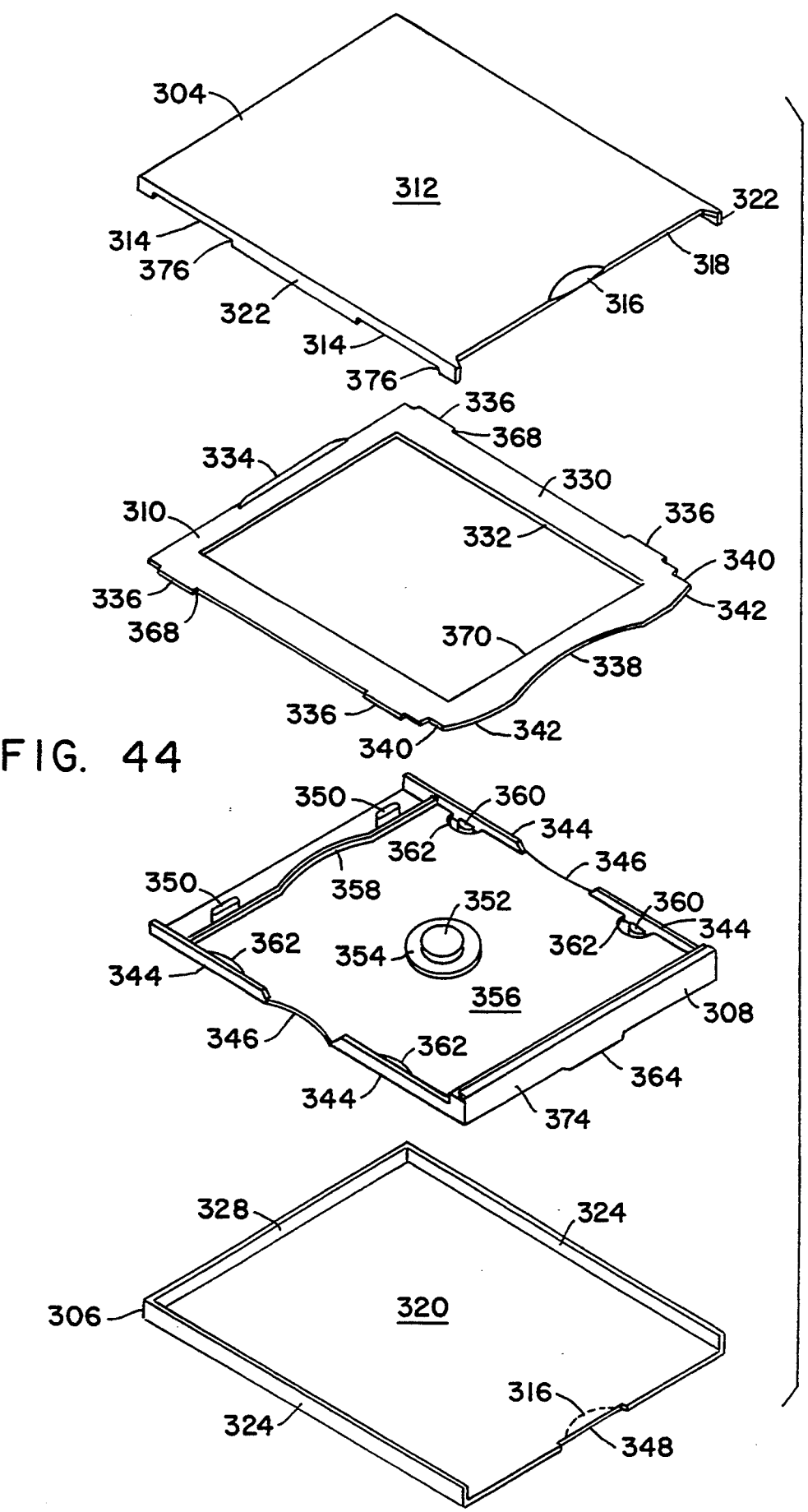
FIG. 44 is an exploded view of another embodiment.
Figure 45:
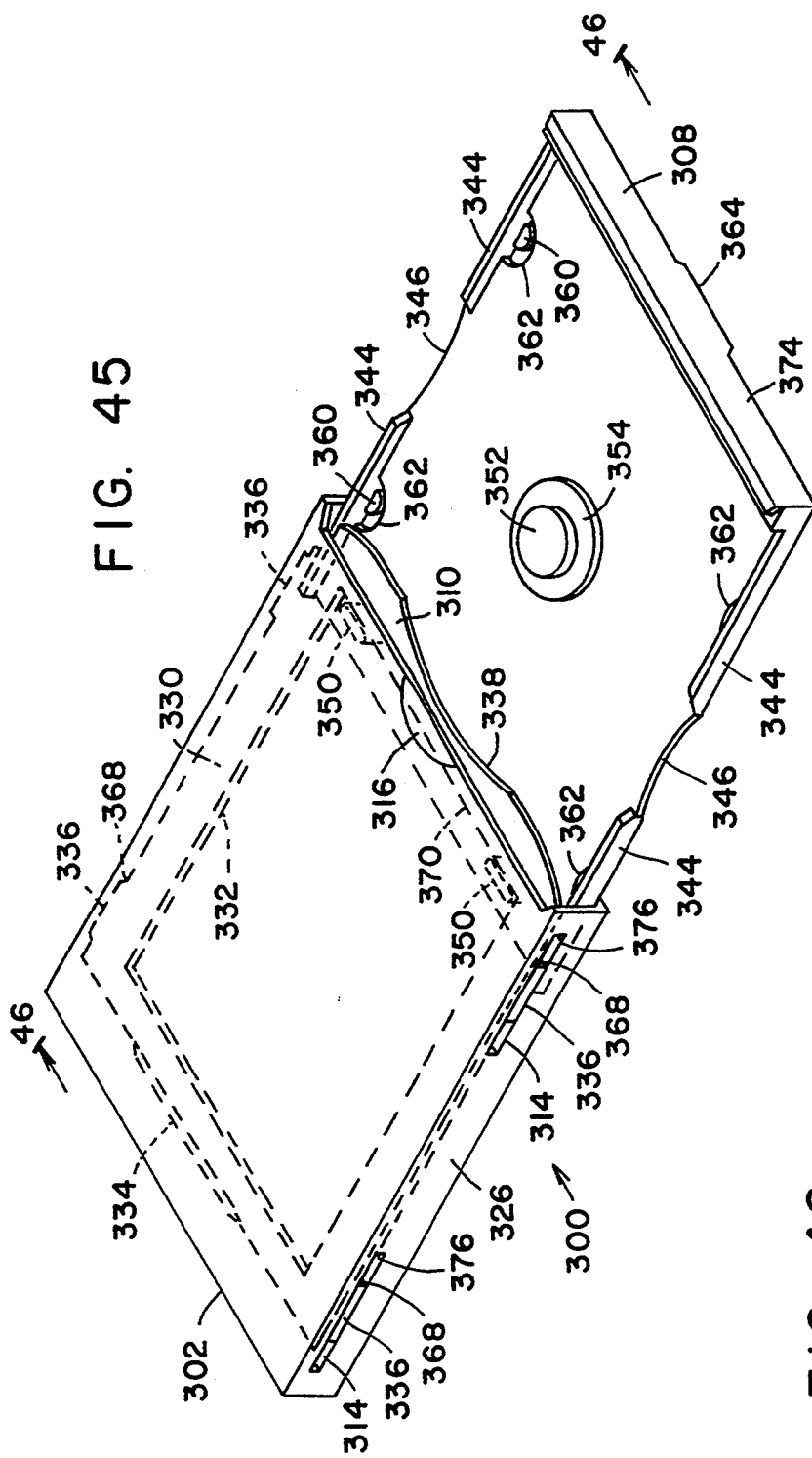
FIG. 45 is a view of the assembled embodiment of FIG. 44.
Figure 46:
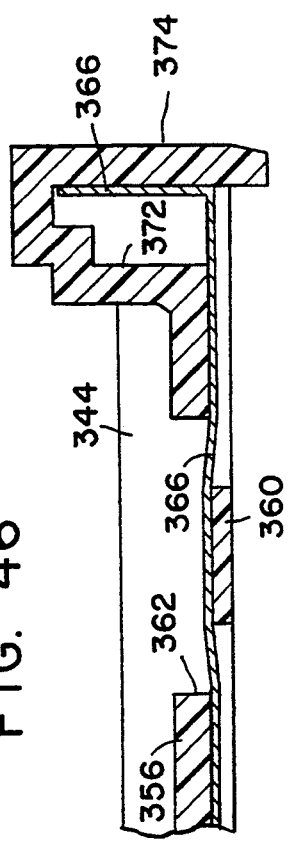
FIG. 46 is an enlarged sectional view taken along line 46—46 of FIG. 45.

FIGS. 44-46 show another embodiment of the invention used for a compact disc and the booklet for the compact disc (for the sake of clarity, neither the compact disc nor the booklet is shown in these figures). Container 300 comprises housing 302 (which in turn comprises top section 304 and bottom section 306), drawer 308, and tray 310. Top section 304 comprises planar member 312 and two sidewalls 322 each having windows (cutouts) 314 (only windows in one sidewall 322 are shown), and a back wall (not shown). Planar member 312 has front edge 318 and conical depression 316.

Bottom section 306 comprises two sidewalls 324, back wall 328, and planar member 320 having conical depression 316 (similar to conical depression 316 in top planar member 312) and cutout 348.

Tray 310 comprises planar member 330 having rectangular cutout 332 (the inside front of which cutout is designated by reference numeral 370), rear upstanding rib 334, and four laterally projecting tabs 336. Each of tabs 336 has front stop surface 368 (only some of which are shown). The front portion of tray 310 has rounded cutout 338, two side notches 340, and two rounded corners 342. When a second article such as a booklet for a compact disc lies on the tray, cutout 338, side notches 340, and rounded corners 342 provide free or open area under the article, thereby allowing the article to be gripped at its front middle or its front sides to facilitate its removal from the tray.

Drawer 308 comprises planar member 356, sidewalls 344 (each having rounded cutout 346), front member 374 (which carries bottom projecting rib 364), back wall 358 (which is curved in its middle region to accommodate the compact disc), and upstanding posts 350. Planar member 356 carries hub 352 and spacer 354. When the compact disc is located in the drawer, the hole in the middle of the disc mates with hub 352 and the disc is supported by washer-like spacer 354 so that the compact disc does not ride directly on planar member 356. Planar member 356 has four lateral circular cutouts 362 to cooperate with tabs 360, as will be described below.

Planar member 312 of top 304 and planar member 320 of bottom 306 each has conical depression 316 at its front to facilitate a tight grip on front 374 of drawer 308 so that the drawer can be pulled out of housing 302 easily. Rib 364, which is at the bottom of the front of drawer 308 and which mates with cutout 348 in bottom planar member 320 when the drawer is fully closed, provides an additional gripping location for this purpose.

Four-piece container 300 may be assembled by placing tray 310 between top 304 and bottom 306 with tabs 336 in their respective windows 314 and then joining top 304 and bottom 306 by, for example, sonic welding. After joining, sidewalls 322 of top 304 and sidewalls 324 of bottom 306 form sidewalls 326 of container 300, and each tab 336 is locked in its respective window 314. The rear edge of drawer 308 is then partially placed in the housing with the rear end of planer member 356 of drawer 308 resting on planar member 320 of bottom 306 and drawer 308 is pushed inwardly, towards its fully closed position.

Because the tops of posts 350 are sloped downwardly towards the rear of drawer 308, when the posts hit the leading edge of tray 310, they raise and then slide under the front portion of tray 310. The front portion remains raised as long as the posts are under the front portion of the tray. Once the posts clear the front portion (so that they are in cutout 332), the resilience of the front portion of the tray causes it to move down again to its normal planar position. The drawer is thereby "locked" in its normal operating position so that it can slide from its fully open position back towards its fully closed position. (To remove the drawer, while the drawer is fully extended beyond the housing, the front portion of the tray is lifted or buckled, thereby allowing posts 350 to pass under the front portion of the tray as the drawer is pulled outwardly.)

During normal operation and starting with the drawer and tray completely closed, as drawer 308 is pulled from its fully closed position (when it is completely inside the housing and only front 374 of the drawer is visible) towards its fully open position (when it is extended from the housing as far as it can travel during normal operation), increasingly more of the drawer and the article carried by the drawer pass out of the housing and posts 350 approach front inner surface 370 of cutout 332. At some point, posts 350 will hit or abut surface 370 of the front portion of the tray. Thus, further continued outward movement of the drawer will force tray 310 to move outwardly, which outward movement of the tray will continue until leading surface 368 of each of four tabs 336 hits its respective stop surface 376 of each window 314. Because outward movement of the tray will thereby be halted and because posts 350 abut surface 370, outward movement of the drawer will also thereby be halted.

At this point, the drawer will be in its fully extended position of its normal operation and the tray will be in its position of maximum extension from the housing. With a standard size compact disc and a standard size booklet, the front of the drawer will extend roughly five inches from the front of the housing and the tray will extend roughly one-half inch from the front of the housing. Because most of the compact disc will not be covered by the booklet or the tray, the disc can be easily removed. The booklet is easily removable because cutout 338, notches 340, and rounded corners 342 allow the leading end and sides of the booklet to be easily and firmly grasped and the booklet pulled out. Rib 334 at the rear end of tray 310 will abut the trailing edge of the booklet as the tray moves out of the housing, thereby insuring that the booklet will not remain inside the housing as the tray moves forward towards its partially extended position at the maximum extent of its outward travel.

After use, the compact disc may be replaced in the drawer with the central hole of the disc mating with the hub and the booklet may be replaced on the tray. As the drawer is pushed inwardly towards its fully closed position, at some point the inner surface of the front of the drawer will hit the booklet and/or the front edge of the tray. Continued inward movement of the drawer will then push the booklet and tray into the housing. When the drawer is in its fully closed position, the tray will also be in its fully closed position (i.e., completely inside the housing).

FIG. 46 shows graphics card 366, which carries recording artist and other information (the "graphics"), in the bottom of the drawer so that the graphics are visible through transparent planar member 320. Card 366 is frictionally held in position between the upper surfaces of tabs 360 and the lower surface of the drawer's planar member 356, above the planar member 320 of the bottom section so that movement of the drawer will not cause the graphics card to rub on the bottom section's planar member 320. The rear end of graphics card 366 (to the left in FIG. 46) is bent up and is located towards the rear end of the drawer. The front end of graphics card 366 (to the right in FIG. 46) is bent up and held in cavity 372 of the front portion of the drawer. Cavity 372 results from the process used to manufacture (e.g., mold) the drawer.

The drawer may be modified to hold two compact discs, or to hold compact discs of different sizes. More than one drawer and/or more than one tray may be used in the same housing. Although not shown in FIGS. 44–46, stacking means 102 (see, e.g., FIG. 14) may be used with the container of FIGS. 44–46. Also, although not shown in FIGS. 44–46, releasable locking means may be used with that container. The overwrap and other features previously described with respect to the other embodiments may also be used.

"Drawer" should be understood to have the widest possible meaning and to include both planar and non-planar members, with and without sidewalls, and with and without cut-outs (or apertures). "Tray" should similarly be understood to have the widest possible meaning. Thus, for example, a drawer or tray may consist of little more than two side bars that help maintain the drawer or tray in the proper position in the container and one or more narrow cross-pieces that connect the side bars.

As used herein, for example, in the phrase "first means for moving a first article into the housing to protect it and substantially out of the housing to allow it to be removed," by "substantially out of the housing" is meant that more than 50 percent, usually at least 60 percent, desirably at least 70 percent, more desirably at least 80 percent, and most desirably at least 90 percent of the first article will extend beyond the housing.

As used herein, for example, in the phrase "third means for moving the second article no more than partially out of housing to allow it to be removed," by "no more than partially out of housing" is meant that less than 40 percent, usually less than 35 percent, desirably less than 25 percent, more desirably less than 20 percent, and most desirably less than 10 percent of the second article will extend beyond the housing.

Thus, with a preferred container, e.g., the container of FIGS. 44–46, if the first article is a compact disc, which is typically about 120 millimeters (about 4.7 inches) in diameter, and if the second article is a standard size booklet for the compact disc, which booklet is about 4.75 inches by 4.75 inches, and if the tray and drawer are extended to their respective maximum travels from the housing, only a few millimeters of the trailing edge of the disc but about 4.25 inches of the booklet will remain in the housing. Generally, when the container is used for compact discs and their booklets, the tray in its partially extended position will not extend more than about one inch from the housing and the drawer will not extend more than about six inches from the housing.

As used herein, for example, in the phrase "means for limiting the movement of the drawer so that it cannot normally be moved out of the housing beyond its fully open position" and in the phrase "means for limiting the movement of the tray so that it cannot normally be moved out of the housing beyond its partially extended position," the word "normally" refers to customary or typical operation of the container and movement of the drawer and tray. As noted herein, if it is desired to remove the drawer from the preferred container, the tray may be bowed or the front portion of the tray may be bent upward (i.e., away from the two posts or members that normally help pull or force the tray out) so that the two members clear (that is, no longer can abut or hit) the tray, thereby allowing the drawer to be slid free of the housing. Such removal does not constitute customary or typical operation of the container or movement of the drawer and tray.

As used herein, for example, in the phrase "first means for moving a first article into the housing to protect it," the word "protect" should be given its widest possible meaning.

As used herein, by "partially extended position" when referring to the tray is meant that less than 40 percent, usually less than 35 percent, desirably less than 25 percent, more desirably less than 20 percent, and most desirably less than 10 percent of the tray will extend beyond the housing.

As will be apparent, the present invention has many benefits, which for convenience will be described with respect to containers of this invention for compact discs. It should be understood that many of these benefits will be realized with articles other than compact discs.

The container of this invention may be the same size and shape as the industry standard compact disc jewel box. Thus, it can fit in standard retailing fixtures and in consumers' storage units. The container of this invention is compatible with the graphic inserts currently used in the jewel box. That allows a distributor to choose either package (standard jewel box or a container of this invention) without having to prepare special artwork. It also allows consumers to replace jewel boxes with a container of this invention and maintain the visual appeal of the standard jewel box.

The container of this invention has no "identity" until the graphic inserts (e.g., on graphics card 366) are added. That reduces inventory requirements and makes it a generic component, allowing economy-of-scale cost savings.

The face of the drawer can present the title of the compact disc from the inside. The spine information may be printed on a flap of the graphics insert, as is done with the standard jewel box, but has not heretofore been accomplished with a container having a drawer (see the right side of FIG. 46).

The separate tray can carry and partially eject the booklet, making the booklet easier to remove and replace and allows the closed package to have the booklet cover the disc, thereby providing visual appeal. Yet when the drawer is fully opened the booklet stays behind, extending only about one-half inch from the container so as not to interfere with removal of the compact disc. If the booklet was instead stored underneath the disc, the package would not be visually acceptable for retail.

Other attempts at developing a container that partially ejected the booklet resulted in containers that were either bigger than the jewel box or could only accept a smaller booklet, or that required members or stops glued onto the booklet, or that were complicated and expensive to produce.

In preferred embodiments, instead of the tray simply being a second drawer with sidewalls, the tray has no sidewalls and has four tabs riding in windows in the sidewalls of the container. The use of such a tray allows the booklet to be as wide as the interior of the case, which in turn permits a standard size booklet to be used with both the standard jewel box and the container of this invention.

The booklet is often difficult to remove from the standard jewel box because it cannot be gripped without lifting its edge and because there are raised surfaces that must be cleared. The booklet can also be difficult to replace because the four (and sometimes six) tabs in the standard jewel box that hold the booklet are not easy to clear.

In contrast, the container of this invention allows the booklet to be removed or replaced without complication. It is easy to remove because the tray has cut-away areas at both sides and in the center of the tray portion that extends out from the case. That allows the user to grab the booklet at the front sides or middle. The booklet can also be easily removed because there is nothing but friction holding the booklet in place. Replacing the booklet is also easier because there are no tabs or other structures that will cause the booklet to jam or misfeed.

Use of the tray also prevents the drawer from rubbing on the booklet, which would impair the graphics printed on the booklet.

The movement of the tray ensures that the booklet will be partially ejected whenever the drawer is fully opened. This ejection is independent of the thinness of the booklet or the slipperiness of its finish. Friction alone between the booklet and the drawer does not always result in ejection of the booklet.

The preferred mechanical system for ejecting the booklet also provides the second function of preventing the drawer from completely leaving the case during normal operation. However, with that construction, if the user does want to remove the drawer, the booklet tray can be flexed (bowed) upwardly or its front portion can be bent upwardly to allow the stops on the drawer to pass and the drawer to be removed.

The partial ejection of the booklet allows the packages to be stacked, like toy building blocks, while still providing easy access to the disc and the booklet without unstacking.

The container of this invention can utilize the tray to limit the vertical motion of the disc on the hub or spindle in the drawer when the drawer is closed, ensuring that the disc cannot come off the spindle. Because the motion of the disc is so limited, the spindle on which the disc sits need not grip the disc. The use of a simple spindle (as opposed to a more complex spindle that grips the disc, as in the standard jewel box) makes it easier to remove and replace the disc. Sometimes the disc can be difficult to remove from the standard jewel box's gripping spindle, requiring that the disc be significantly deformed for removal. Sometimes the disc may not be properly replaced on the gripping spindle, thereby allowing the disc to fall from the box when it is opened. Thus, the container of this invention reduces the chance of damaging the disc during shipment and reduces the chance of a loose disc falling when the box is opened (which could cause the disc to pick up contaminants and become scratched).

With a preferred container, the drawer extends to present almost the entire disc with two recesses on either side of the disc to facilitate gripping the edge of the disc with thumb and finger. These recesses leave nothing under the disc to interfere with the gripping of the edge. The standard jewel box has plastic under the disc in these two areas, making it difficult to grip the disc.

With a preferred container, the drawer also presents the disc with its information-bearing surface covered, which prevents the user from touching this surface. In contrast, other known containers present the disc in ways that encourage gripping the information-bearing surface. The resulting fingerprints and oils left are unsightly and may degrade the information-bearing surface.

The hingeless design of the container of this invention eliminates the gray bar on the face of the standard jewel box and in fact allows for the use of a larger booklet. Such a larger booklet would provide a stronger image for retail and an easier-to-read format (e.g., larger type) without changing the size of the package. The booklet graphics are visible, e.g., through transparent planar member 312 (FIG. 44).

Variations and modifications will be apparent to those skilled in the art and the claims are intended to cover all such variations and modifications that fall within the true spirit and scope of the invention. For example, any material of construction may be utilized for the container so long as it has the required physical properties (e.g. strength, resilience, flexibility). The housing means, drawer means, and tray means need not necessarily have all the walls and faces described herein but instead may complement each other to eliminate some of the walls and/or faces. Conversely, additional walls and faces may be utilized.

Releasable locking means 86 will normally be utilized only once, when the container/package is displayed, e.g., for sale. After the container/package with its article(s) has been sold, the releasable locking means will be released, and the drawer will be able to move between open and closed positions for storage. The releasable locking means will not again be needed and will not thereafter function in normal use. Of course, if the particular releasable locking means permits, that means may be reset, which resetting will thereafter prevent the drawer from moving inward unless that means is again released.

In some embodiments, during normal use in the storage configuration the drawer will not normally be movable to as open a position as when the drawer was in its releasably locked position in the display configuration. Instead, the drawer will normally be outwardly movable as far as an intermediate open position that usually (but not necessarily) will not be too far from the more open display position.

When releasably locked in its open expanded display position, the drawer will not normally be movable to its fully closed position unless it is, e.g., forced to move inward, i.e., the drawer in its releasably locked position will not normally be inwardly movable. A drawer that must be moved inward to release the releasable locking means is considered not to normally be inwardly movable.

Where an element or member "has" or "carries" another element or member, "has," "having," "carries," "carrying," "carried by," etc. should be understood to have the widest possible meaning and to include all forms of upholding, supporting, transporting, bearing, connection, affixation, attachment, and the like, whether direct or indirect. Thus, for example, in FIG. 42, releasable locking means 86 is directly connected to removable tray 144, which in turn rides in (is carried by) drawer 84. Although means 86 is not (strictly speaking) directly affixed to drawer 84, means 86 is considered to be carried by drawer 84, in other words, means 86 comprises the releasable locking means of drawer 84, or, drawer 84 has releasable locking means 86.

I claim:
1. A container comprising:
   (a) a housing;
   (b) a drawer for carrying a first article, the drawer being slidably mounted in the housing so that it can be moved between a fully closed position in the housing and a fully open position in the housing; and
   (c) a tray for carrying a second article, the tray being slidably mounted in the housing so it can be moved between a fully closed position in the housing and a partially extended position in the housing, the drawer in its fully open position extending from the housing beyond the tray when the tray is in its partially extended position;
   the container having urging means for urging the tray towards its partially extended position as the drawer is moved towards its fully open position.

2. The container of claim 1 further comprising drawer-travel-limiting means for limiting the movement of the drawer so that it cannot normally be moved out of the housing beyond its fully open position.

3. The container of claim 1 further comprising tray-travel-limiting means for limiting the movement of the tray so that it cannot normally be moved out of the housing beyond its partially extended position.

4. The container of claim 3 wherein the tray-travel-limiting means comprises two stop surfaces, which are a stop surface carried by the tray and a stop surface carried by the housing.

5. The container of claim 4 wherein the two stop surfaces abut to limit movement of the tray beyond its partially extended position.

6. The container of claim 4 further comprising a member projecting from the tray wherein the stop surface carried by the tray comprises a surface on that member.

7. The container of claim 4 wherein the housing has a sidewall and the stop surface carried by the housing is carried by the sidewall of the housing.

8. The container of claim 1 wherein the urging means comprises a member carried by the drawer.

9. The container of claim 8 wherein the urging means further comprises a surface on the tray.

10. A package comprising the container of claim 1, a first article, and a second article wherein the first article is carried by the drawer, the second article is carried by the tray, the first article is a compact disc, and the second article comprises material concerning the compact disc.

11. A container comprising:
   (a) a housing;
   (b) a drawer for releasably carrying a first article, the drawer being slidably mounted in the housing so that it can be moved between a fully closed position in the housing and a fully open position in the housing; and (c) a tray for releasably carrying a second article, the tray being slidably mounted in the housing so it can be moved between a fully closed position in the housing and a partially extended position in the housing, the drawer in its fully open position extending from the housing beyond the tray when the tray is in its partially extended position;

the container having (i) urging means comprising a surface on the drawer and a surface on the tray for urging the tray towards its partially extended position as the drawer is moved towards its fully open position, (ii) drawer-travel-limiting means for limiting the movement of the drawer so that it cannot normally be moved out of the housing beyond its fully open position, and (iii) tray-travel-limiting means for limiting the movement of the tray so that it cannot normally be moved out of the housing beyond its partially extended position; wherein the tray-travel-limiting means comprises a stop surface carried by the tray and a stop surface carried by the housing that abut when the tray is in its partially extended position to prevent movement of the tray beyond its partially extended position.

12. The container of claim 11 wherein the stop surface carried by the tray comprises a surface on a member projecting laterally from the tray.

13. The container of claim 11 wherein the housing has a sidewall and the stop surface carried by the housing is carried by the sidewall of the housing.

14. A package comprising the container of claim 11, a first article, and a second article, wherein the first article is carried by the drawer, the second article is carried by the tray, the first article is a compact disc, and the second article comprises material concerning the compact disc.

15. The package of claim 14 wherein the tray when in its partially extended position extends not more than approximately one inch beyond the housing.

16. The package of claim 15 wherein the drawer when in its fully open position extends not more than approximately six inches beyond the housing.

17. A container for articles comprising:
(a) a housing;
(b) first means for moving a first article into the housing to protect it and substantially out of the housing to allow it to be removed;
(c) second means for receiving a second article in the housing to protect it; and
(d) third means for moving the second article no more than partially out of housing to allow it to be removed;
the first means cooperating with the third means so that the first means moving the first article out of the housing causes the third means to move the second article out of the housing.

18. The container of claim 17 wherein the first means comprises a drawer that is slidably mounted in the housing.

19. The container of claim 18 wherein the second means and third means comprise a tray that is slidably mounted in the housing.

20. The container of claim 19 wherein the first means and third means cooperate at least in part by a member projecting from the drawer.

21. A package comprising the container of claim 17 in which the first article is carried by the first means and the second article is carried by the second means.

22. The package of claim 21 wherein the first article is a compact disc and the second article comprises material concerning the compact disc.

23. The container of claim 1 further comprising means for locking the drawer in an open position.

24. The container of claim 11 further comprising means for locking the drawer in an open position.

25. The container of claim 18 further comprising means for locking the drawer in an open position.

26. The package of claim 10 wherein the container further comprises means for locking the drawer in an open position and the drawer is locked in an open position.

27. The package of claim 14 wherein the container further comprises means for locking the drawer in an open position and the drawer is locked in an open position.

28. The package of claim 21 wherein the first means is a drawer, the container further comprises means for locking the drawer in an open position, and the drawer is locked in an open position.

* * * * *